US011564088B2

(12) United States Patent
Boyd et al.

(10) Patent No.: US 11,564,088 B2
(45) Date of Patent: *Jan. 24, 2023

(54) VEHICULAR COMMUNICATION OF EMERGENCY INFORMATION

(71) Applicant: The Government of the United States of America, as represented by the Secretary of Homeland Security, Washington, DC (US)

(72) Inventors: Daniel A. Boyd, Arlington, VA (US); Kelli L. Biegger, McLean, VA (US); Chang Ellison, Arlington, VA (US); Brandon P. Gutierrez, Burke, VA (US); Jason Lim, Alexandria, VA (US); William Washington, North Potomac, MD (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/852,687

(22) Filed: Jun. 29, 2022

(65) Prior Publication Data

US 2022/0353676 A1    Nov. 3, 2022

Related U.S. Application Data

(63) Continuation of application No. 17/180,334, filed on Feb. 19, 2021, now Pat. No. 11,405,779.

(Continued)

(51) Int. Cl.
*G06F 7/04* (2006.01)
*G06F 15/16* (2006.01)
(Continued)

(52) U.S. Cl.
CPC ............ *H04W 12/04* (2013.01); *H04W 4/46* (2018.02); *H04W 12/02* (2013.01);
(Continued)

(58) Field of Classification Search
CPC ... H04W 12/04; H04W 12/033; H04W 12/02; H04W 12/08; H04W 4/46
(Continued)

(56) References Cited

U.S. PATENT DOCUMENTS 9,147,117 B1   9/2015 Madhu et al.
9,305,155 B1   4/2016 Vo et al.
(Continued)

FOREIGN PATENT DOCUMENTS

WO   2016/130168 A1   8/2016
WO   2017/082756 A1   5/2017

*Primary Examiner* — Jeffrey C Pwu
*Assistant Examiner* — Samuel Ambaye
(74) *Attorney, Agent, or Firm* — Lavanya Ratnam; Robert W. Busby; Kelly G. Hyndman

(57) ABSTRACT

A stopped vehicle information remote retrieval method includes an emergency personnel or first responder vehicle (FRV) establishing a vehicle connection between an infotainment system of a stopped vehicle and the FRV. The FRV sends a vehicle information request to the infotainment system of the stopped vehicle, via the vehicle connection, seeking release of vehicle information. The FRV obtains authentication of the vehicle information received in response to the vehicle information request. The FRV determines occupant status based on the vehicle information. The FRV communicates the passenger status to a first responder.

20 Claims, 19 Drawing Sheets

Related U.S. Application Data

(60) Provisional application No. 63/050,536, filed on Jul. 10, 2020.

(51) Int. Cl.

| | | |
|---|---|---|
| *H04L 29/06* | (2006.01) | |
| *H04W 12/04* | (2021.01) | |
| *H04W 12/02* | (2009.01) | |
| *H04W 12/033* | (2021.01) | |
| *H04W 4/46* | (2018.01) | |
| *H04W 12/08* | (2021.01) | |
| *G06K 7/10* | (2006.01) | |
| *G05D 1/00* | (2006.01) | |

(52) U.S. Cl.
CPC ......... *H04W 12/033* (2021.01); *H04W 12/08* (2013.01); *G05D 1/00* (2013.01); *G06K 7/10* (2013.01)

(58) Field of Classification Search
USPC .................................................. 726/4
See application file for complete search history.

(56) References Cited

U.S. PATENT DOCUMENTS

| | | |
|---|---|---|
| 9,436,818 B1 | 9/2016 | Tooley, III |
| 9,672,336 B1 | 6/2017 | Spence |
| 10,013,983 B1 | 7/2018 | Johnson et al. |
| 10,200,397 B2 | 2/2019 | Dhar et al. |
| 10,503,912 B1 | 12/2019 | Kerr |
| 10,970,375 B2 | 4/2021 | Shila et al. |
| 11,005,839 B1 | 5/2021 | Shahidzadeh et al. |
| 2007/0079136 A1 | 4/2007 | Vishik et al. |
| 2007/0214357 A1 | 9/2007 | Baldus et al. |
| 2008/0184037 A1 | 7/2008 | Johnson |
| 2009/0104902 A1 | 4/2009 | Twitchelle, Jr. |
| 2011/0121991 A1 | 5/2011 | Basir |
| 2013/0013553 A1 | 1/2013 | Stibel et al. |
| 2013/0097047 A1 | 4/2013 | Kim |
| 2013/0184898 A1 | 7/2013 | Gersabeck et al. |
| 2014/0143839 A1 | 5/2014 | Ricci |
| 2014/0207537 A1 | 7/2014 | Joyce et al. |
| 2015/0074268 A1 | 3/2015 | Alms |
| 2015/0097703 A1 | 4/2015 | Baur |
| 2016/0055322 A1 | 2/2016 | Thomas |
| 2016/0078581 A1 | 3/2016 | Maher |
| 2017/0032485 A1 | 2/2017 | Vemury |
| 2017/0088098 A1 | 3/2017 | Frank et al. |
| 2018/0012324 A1 | 1/2018 | Kelts |
| 2018/0012427 A1 | 1/2018 | Ricci |
| 2018/0165655 A1 | 6/2018 | Marcelle et al. |
| 2018/0309592 A1 | 10/2018 | Stolfus |
| 2018/0336327 A1 | 11/2018 | Wallace et al. |
| 2018/0337917 A1 | 11/2018 | Wallace et al. |
| 2018/0365909 A1 | 12/2018 | Cheng et al. |
| 2019/0036688 A1 | 1/2019 | Wasily et al. |
| 2019/0043148 A1 | 2/2019 | Vemury |
| 2019/0057412 A1 | 2/2019 | Bhattacharjee et al. |
| 2019/0163876 A1 | 5/2019 | Remme et al. |
| 2019/0163887 A1 | 5/2019 | Frederick et al. |
| 2019/0164165 A1 | 5/2019 | Ithabathula |
| 2019/0213820 A1 | 7/2019 | Sebes et al. |
| 2019/0287111 A1 | 9/2019 | Cvetkovich et al. |
| 2020/0034553 A1 | 1/2020 | Kenyon et al. |
| 2020/0036528 A1 | 1/2020 | Ortiz et al. |
| 2020/0084039 A1 | 3/2020 | Chabanne et al. |
| 2020/0168306 A1 | 5/2020 | Chen et al. |
| 2020/0351089 A1 | 11/2020 | Wentz |
| 2021/0304591 A1 | 9/2021 | Small et al. |

VEHICULAR COMMUNICATION OF EMERGENCY INFORMATION

CROSS-REFERENCE TO RELATED APPLICATIONS

This application is a continuation of U.S. non-provisional application Ser. No. 17/180,334 entitled "Vehicular Communication of Emergency Information to First Responders," filed on Feb. 19, 2021, which claims the benefit of priority from U.S. Provisional Application No. 63/050,536 entitled "Vehicular Communication of Emergency Information to First Responders," filed on Jul. 10, 2020, the disclosure of all of which are incorporated by reference in their entireties.

STATEMENT OF GOVERNMENT INTEREST

The present invention was made by one or more employees of the United States Department of Homeland Security in the performance of official duties. The U.S. Government has certain rights in this invention.

FIELD

The discussion below relates generally to the remote retrieval of information from a vehicle operating system, such as vehicle identification information, interior sensor information, or occupant status.

BACKGROUND

Emergency personnel or first responders to the scene of an incident or accident generally encounter a scene that is in disarray, where location and assessment of the individuals at the scene are priorities. Information is crucial for the first responder to assess and implement a response. During the response, emergency personnel can encounter a vehicle damaged or in peril from collision, fire, flood, or worse. Emergency personnel cannot always know for certain how many victims there are, or where to find them. For example, a given situation may involve an unresponsive driver or passengers (also referred to herein variously as user, driver, subject, occupant, vehicle occupant, subject occupant, or passenger). A given situation also may involve a vehicle (in a flood or fire) that is difficult for the first responders to reach, potentially delaying assessment of the status of the vehicle and its occupants. In another example, a vehicle can be involved in an accident that ejects the occupants, who may be unconscious and located far from the vehicle, perhaps hidden from sight.

Traffic stops, similarly, can be risky for first responders who are law enforcement officers (LEDs). Any given traffic stop—where an LEO first responder in a patrol car (or unmarked car) pulls over a subject occupant or occupants in a vehicle—holds unknown possibilities that can include confrontation or violence.

The LEO may have some ability to reduce unknowns, such as checking the vehicle's license plate, or observing the number of vehicle occupants from a distance. To more fully explore the situation, however, the LEO may need to approach the stopped vehicle—which increases risk to the first responder: multiple subject occupants may be hiding in the vehicle; the subject occupant driving the vehicle might not lawfully possess it; the vehicle might have a stolen license plate; and information about the subject occupants in the vehicle might not be available to the LEO without first obtaining identification from them, in person, and then returning to the law enforcement vehicle to check the identification.

Thus, first responder time and resources are devoted to verifying the identity (i.e. registration information) of a stopped vehicle and the status or identity of the subject occupant or occupants within or otherwise associated with the vehicle. Such staffing and resources are further burdened and put at risk by a need for the above-mentioned manual verification performed by the first responder, who needs to exit a first responder vehicle or law enforcement vehicle to check the identity of the stopped vehicle, as indicated by registration information of the stopped vehicle. The first responder also must check or collect physical documents from the subject occupant and check other sources of information available for the subject occupant. Such staffing and resources are further burdened when attempting to resolve inconsistencies with a vehicle's license plate, Vehicle Identification Number (VIN), or other vehicle information, compared to the proof of insurance, registration, and other physical documents presented by the subject occupant during a stop. In the event of an accident in which a subject occupant is unresponsive, the first responders may be unaware of a need to locate ejected vehicle occupants, particularly when multiple occupants are involved, and the first responders have already found the assumed driver.

Drivers find it inconvenient to keep on hand readily available copies of vehicle information and documentation, to keep vehicle insurance cards up to date, and to patiently await the investigation of their information by the LEO. Additionally, vehicle occupants in an emergency situation may be unconscious or otherwise incapable of responding or providing consent to release information. Vehicles may be unreachable by the first responders, or otherwise in an unsafe condition that prevents the first responders from entering the vehicle.

The interaction between first responders and stopped vehicles, such as in emergencies or traffic stops (vehicle stops), leaves room for improvements that can save lives, reduce risk, improve efficiency, add convenience, and diminish stress for all parties.

SUMMARY

The detailed description below discloses approaches that may ameliorate the foregoing risks by harnessing mobile identification credential technology in vehicle scenarios.

In one embodiment, a first responder vehicle utilizing a Mobile Digital Terminal (MDT), Police Mobile Computer (PMC), Mobile Data Terminal (MDT), or other in-vehicle laptop (computer) through which a first responder may remotely retrieve vehicle license details, offender records, incident logs, vehicle tracking system information or other information, is hereinafter referred to as an FRV. The FRV remotely communicates vehicle-to-vehicle with the stopped vehicle. The stopped vehicle provides information from the engine computer (EC), generally referred to as the electronic control module (ECM), electronic control unit (ECU) or powertrain control module (PCM). Such information is provided to the FRV directly or through the automotive head unit or vehicle operating system, generally referred to as the infotainment system. Such communications enable the first responders to receive information from the engine computer or infotainment system of the stopped vehicle, regarding the vehicle identity, vehicle status, occupant identity, or occupant status even if the stopped vehicle is disabled or unapproachable, and the occupants are unresponsive. The first responders accordingly have remote access to vehicle identification information, interior sensor information, or occupant status pertaining to the stopped vehicle.

In another embodiment, the FRV is a law enforcement vehicle (LEV) that communicates vehicle-to-vehicle with the stopped vehicle. The stopped vehicle provides its VIN to the LEV, making it unnecessary for the LEO to obtain the VIN by leaving the LEV.

In another embodiment, the FRV queries the stopped vehicle to remotely obtain vehicle sensor information that alerts the LEO to occupant information regarding additional persons currently in or previously in the stopped vehicle (e.g., prior to an accident that ejects occupants).

In yet another embodiment, the FRV queries the stopped vehicle to remotely obtain vehicle sensor information that alerts the LEO to the possible presence of additional persons in the stopped vehicle during a stop.

In yet another embodiment, the FRV queries the stopped vehicle to remotely obtain vehicle information including vehicle sensor information or vehicle status information. The vehicle status information may include information about the vehicle that relates to a potential citation for which the LEV has pulled over the stopped vehicle. In an example scenario, the LEV has pulled over the stopped vehicle to issue a citation for an inoperable turn signal, and the vehicle status information includes operational vehicle status information and mechanical vehicle status information such as turn signal telemetry information indicating whether the turn signal was activated or functioning properly.

In an embodiment, the use of a mobile identification credential (MIC) enables vehicle occupants to electronically furnish their information to a first responder, via the EC or infotainment system of the stopped vehicle, to the first responder's FRV. For example, the driver or other occupant can furnish their driver's license to an LEO first responder via the LEO's LEV.

One example of a MIC is a mobile driver license (mDL), also referred to as a digital driver license. The MIC is issued by a MIC provider. The MIC provider, for example, may be a state department of motor vehicles (DMV).

Employment of the MIC may occur within a supportive environment (disclosed in the detailed description, below). The environment may include a user device to which the MIC is provisioned—a user mobile-identification-credential device (UMD). Within the environment, a MIC provider, also referred to as an authorizing party (AP), in one embodiment, has an authorizing party system (APS) that may provision the MIC to the UMD. The environment also may include a relying party (RP) that will interact with the UMD by way of a relying party system (RPS). In an embodiment, the stopped vehicle's automotive head unit serves as an RPS in communication with the UMD 200 of the driver or the UMD 200 of other vehicle occupants.

The user's or driver's vehicle (referred to herein as stopped vehicle 100, regardless of whether the vehicle is in motion or stopped) is associated with vehicle information 80 including vehicle identity such as a Vehicle Identification Number (VIN) or registration information, and vehicle information including vehicle status information from various sensors such as seat pressure air bag sensors, seat occupancy sensors, seat belt sensors, airbag deployment sensors, interior motion sensors, and the like. Vehicle status information includes a vehicle on or off status, indicating whether the vehicle is running or shut off. Vehicle status information also includes operational vehicle status information or mechanical vehicle status information, to indicate the operation or use of vehicle equipment, or the mechanical status of vehicle equipment, such as turn signals, brakes, emissions, outstanding recalls, or other usage telemetry, operational telemetry, or maintenance telemetry, and the like. The vehicle information is available to one or more Electronic Control Units (ECUs) of the stopped vehicle 100. For example, the VIN is encoded in an Engine Control Module (ECM) ECU of the stopped vehicle 100. Modern vehicles include pressure sensors within vehicle seats to determine occupancy for airbag deployment. Such occupancy determination is relayed as an indicator of vehicle occupant status. The sensor information enables the stopped vehicle 100 to identify a weight or lack of weight on the seat, which is used to determine whether a person or object is in the seat. In vehicles that include interior motion sensors commonly used for notice of unauthorized entry, sensor data indicating movement in a location of the vehicle is used to indicate the likelihood of an occupant in that location of the vehicle, e.g., to determine whether a person is in the back of the stopped vehicle 100. In an embodiment, the vehicle (e.g., via an automotive head unit of the stopped vehicle 100) is configured to save such sensor information over time. Accordingly, it is possible to store and remotely retrieve sensor information indicative of occupant status over time. In an example scenario, an FRV remotely retrieves sensor information indicative of occupant status recorded prior to a vehicle accident, to determine the number of occupants that need to be accounted for when responding to the vehicle accident. In yet another example scenario, an FRV uses an emergency override command or function to remotely retrieve MIC user information 40 of an incapacitated or unconscious vehicle occupant (one that cannot provide permission for data transmission to the FRV), allowing transmission of data that would identify any special medical needs of that vehicle occupant. For example, the FRV could remotely retrieve MIC information of an occupant to enable fast and efficient retrieval or determination of a blood type of the occupant and whether the occupant is allergic to a common medication, suffers from a disease such as hemophilia, or other pertinent medical information or medical records. In an embodiment, the FRV is configured to access a medical records database using the MIC user information 40 from the occupant to determine such pertinent medical information.

The VIN, sensor, and other vehicle information 80, including vehicle identification information, interior sensor information, operational vehicle status information, mechanical vehicle status information, or occupant status information, is available to vehicle communication systems of the stopped vehicle 100, such as third-party systems or applications that interface with an automotive head unit of the stopped vehicle 100. Such third-party systems enable external access (e.g., via communication systems) to vehicle information generated by or stored in the head unit or ECUs.

In embodiments, the automotive head unit includes vehicle communication systems. Vehicle communication systems enable the automotive head unit to communicate with systems internal or external to the vehicle. Internal systems include a laptop computer, User Mobile Device, or Mobile Data Terminal (MDT) accessible to the first responder. External systems include remote servers, other vehicles supporting wireless vehicle communication systems or Mobile Data Terminals (MDTs), and user mobile devices. In embodiments, vehicle communications are wireless and based on Wi-Fi, Bluetooth Class 1 or 2, a cellular radio system, Citizens Band (CB) radio, and the like. In embodiments, the vehicle information 80 including VIN and sensor information available to the automotive head unit are selectively shared via the wireless vehicle communication systems with other vehicles.

In an embodiment, the first responder approaches within communication range of a stopped vehicle 100. The vehicles may automatically establish vehicle-to-vehicle communications. In another embodiment, the first responder initiates, via their in-vehicle laptop or other interface to vehicle communications device, a query from the FRV to the stopped vehicle 100. The laptop directs the FRV's automotive head unit to establish communications with the stopped vehicle's automotive head unit. The FRV's infotainment system or automotive head unit then remotely retrieves the vehicle information 80 from the stopped vehicle's automotive head unit via the established vehicle communications. The vehicle information 80 includes information that is evident remote from the stopped vehicle 100, such as VIN number, license plate number, vehicle make, and vehicle model. The vehicle information 80 also includes information such as operational vehicle status information and mechanical vehicle status information.

In another embodiment, the first responder directs the FRV's automotive head unit to remotely request consent from the stopped vehicle 100 to release more of the vehicle information 80, such as interior sensor information or other indicators of occupant status within the stopped vehicle 100, operational vehicle status information or mechanical vehicle status information regarding the status or use of vehicle equipment including usage telemetry, operational telemetry, or maintenance telemetry, and the like. Vehicle information 80 remotely obtained from the vehicle may be associated with consent. Especially when the requested information is personally associated with an occupant, this type of information remotely retrieved from the stopped vehicle 100 may not readily be evident from exterior visual inspection of the vehicle, such as present or past occupant status. Furthermore, the type of information requested from or released by the stopped vehicle may relate directly to the nature of the traffic stop, to ensure the requested information is relevant, and that the request does not obtain unnecessary information that exceeds the scope of the stop.

In an embodiment, the FRV's automotive head unit communicates with the stopped vehicle 100 to permissively exchange and use various information to improve upon and provide additional functionality for electronic platforms for LEO ticketing systems. For example, in addition to enabling the LEO to obtain and pre-populate a citation with vehicle occupant information (e.g., as obtained from an online server), embodiments enable an LEO ticketing system to perform additional functions. Such additional functions include the option of operating offline (e.g., in remote locations) by exchanging information between the FRV's automotive head unit and the stopped vehicle 100, without needing to obtain such information from an online server. Embodiments enable the FRV's automotive head unit to transmit information articulating why the stopped vehicle was pulled over, or include a record of LEO information, precinct information, LEO office information, or the like. The FRV's automotive head unit may send a citation and related information (ticket number and the like) to the stopped vehicle, and obtain the occupant's denial or acknowledgement of the citation. The FRV's automotive head unit can selectively request different types of information, and allow for the occupant to selectively control whether to release, e.g., occupant identity information, vehicle information, operational vehicle status information, or mechanical vehicle status information (such as vehicle status information pertaining to the citation, or information limited to a time range corresponding to a time of an alleged infraction of the citation).

In another embodiment, the FRV's automotive head unit identifies a permission override situation, such as an emergency or situation where consent cannot or is unlikely to be obtained (airbag deployment, occupants unresponsive to alarm), which directs the stopped vehicle 100 to release the vehicle information 80. By way of example, an override command or function could be utilized if a first responder approaches a burning vehicle or one located in an area of hazard to the first responder. Information providing the likelihood that the vehicle contains or contained an occupant would be invaluable information to the first responder, before the first responder approaches the vehicle hazard to determine if occupants of the vehicle need emergency services.

Communications between vehicles may be implemented via direct communication systems or indirect communication systems. Example direct communication systems involve establishing a connection directly between vehicles, such as via cellular, Wi-Fi, Bluetooth, or Citizens Band (CB) radio. Example indirect communication systems are based on an external infrastructure including a network or server, whereby each vehicle establishes its own connection to the external infrastructure, which facilitates communication between the vehicles or servers. Systems that employ an indirect connection (indirect communication systems) include cellular phone networks and other systems that rely on the cellular phone network or a server to connect client communication devices to each other. The wireless communications between vehicles allows for a safety buffer distance between the FRV 400 and the stopped vehicle 100.

In response to establishing communications between the FRV 400 and the stopped vehicle 100, the stopped vehicle 100 responds with vehicle information, including the vehicle's VIN and, in another embodiment, also with its vehicle status or sensor information including operational vehicle status information or mechanical vehicle status information. The VIN may enable the first responder, dispatch, or other first responder or law enforcement resource to access information about the stopped vehicle 100, including owner registration information or license plate number. Such accessed information may be included in the vehicle information 80 remotely obtained through direct vehicle-to-vehicle communication, indirect vehicle communication, or through FRV communication with a remote server such as a back end, from which the accessed information may be queried through the use of information remotely obtained from the stopped vehicle. Example information repositories on such back ends comprise information from sources such as a State DMV or other database of personally identifiable information (PII) or information relevant to the identification of the stopped vehicle itself or the vehicle's occupant(s). Accordingly, the first responder can detect potential mismatches between the observable characteristics of the stopped vehicle and the vehicle information 80 (e.g., a license plate not attributed to the vehicle or vehicle registration information that does not match the observable occupant). Such vehicle information 80, including the remotely accessed information, is provided to the first responder via the in-vehicle laptop or other device accessible to the first responder, without a need for the first responder to exit the FRV 400 to obtain such information.

The sensor information from the stopped vehicle 100 informs the first responder of the possible presence of other occupants of the stopped vehicle 100. If the stopped vehicle 100 is equipped with sensors in each seat, the number of activated sensors in the stopped vehicle 100 provides an indication of the number of persons in the stopped vehicle 100 and, in an embodiment, their positions within the stopped vehicle 100.

In an embodiment, the stopped vehicle's automotive head unit requests vehicle occupant approval prior to sharing the vehicle information 80 with the FRV 400 and first responder. In a related embodiment, the first responder indicates the presence of emergency circumstances that permit overriding the requirement for vehicle occupant approval to release the vehicle information 80 or vehicle occupant or passenger information.

In another embodiment, the stopped vehicle's automotive head unit (also referred to as infotainment system) is in communication with a UMD 200 of the stopped vehicle 100. The stopped vehicle's automotive head unit prompts, and accepts information from, occupants of the stopped vehicle 100 using a mobile application (app) on a vehicle occupant's UMD 200. Communication between the stopped vehicle's automotive head unit and the occupant's UMD 200 is handled via wired or wireless connections, including close-proximity wireless connections (such as connections based on near frequency communication (NFC) or Bluetooth class three or class four devices) having a range less than that used by vehicle-to-vehicle automotive head unit communications (such as connections based on Bluetooth class one or class two devices). Such communication with the occupant's UMD 200 enables the occupant to receive information, such as instructions to best comply with the vehicle stop, via the head unit or UMD. In other embodiments, such communications are established between the stopped vehicle's automotive head unit and UMD(s) possessed by other persons in the stopped vehicle 100.

In an embodiment, the FRV 400 serves as an RPS to request stopped vehicle information 80 (VIN and other vehicle identification information, vehicle status information, vehicle sensor information, occupant status, etc.) from the stopped vehicle 100 serving as a UMD. In another non-limiting embodiment, the stopped vehicle 100 serves as an RPS 101 (see FIG. 3) to handle a request for MIC user information 40 (also referred to as official information) from the occupants, who submit their MIC to the stopped vehicle RPS (e.g., using a UMD to furnish their license electronically to the stopped vehicle, which in turn furnishes the user information to the FRV). In a non-limiting embodiment, the UMD may be a smart phone of a vehicle occupant, the MIC may be an mDL, the AP may be the state DMV, the APS may be a computer system of the DMV, the RP may be the stopped vehicle, and the RPS may be an automotive head unit of the stopped vehicle.

When the user (e.g., serving as a driver or other occupant of a vehicle) is stopped, they may choose to use their MIC to control the release of vehicle information 80 or furnish their identity or other MIC user information 40 (i.e., official information) to the first responder. These choices may be made via a dialog conducted between the RPS and the UMD—a release dialog (also referred to as a privacy dialog or, in some embodiments, a consent dialog). During the dialog, the RPS 101 sends the UMD 200 a request for MIC user information 40 (official information). With the permission of the user, in an embodiment, the APS 300 releases the MIC user information 40 requested by the RPS 101; the RPS 101 provides the MIC user information 40 associated with the MIC 210. The occupant is prompted to consent to the release of their driver license or other information and, in an embodiment, the release of relevant third-party documents associated with the occupant identity such as vehicle title or registration information. Where the MIC 210 is an mDL, the user may authorize the release of selected information from the mDL or DMV. The occupant also may be prompted to acknowledge or deny a citation, and may be prompted to release vehicle information 80 pertaining to the citation.

Using the MIC environment 10 in these ways thereby provides another potential source of user information to the first responder, in addition to the vehicle-to-vehicle connection between the automotive head units of the FRV 400 and the stopped vehicle 100. Accordingly, in addition to obtaining vehicle information from information remotely provided by the vehicle, the MIC environment 10 enables the first responder to request further information that may be optionally provided by the occupants of the stopped vehicle. Furthermore, the MIC environment 10 enables the first responder to observe whether vehicle occupants (as reported by the vehicle information) are willing to share or withhold their MIC user information 40 or vehicle information 80, indicating unresponsive or uncooperative vehicle occupants.

In another, non-limiting embodiment, an automotive head unit of the stopped vehicle 100 serves as a Relying Party System (RPS). The RPS 101 and the UMD 200 establish a secure (i.e., encrypted) local connection via a Quick Response (QR) code scannable by the UMD 200 or via electromagnetic radiation communications such as in NFC, Bluetooth, or RFID technologies. When the encrypted local connection (also referred to as a secure local connection) is established, the RPS 101 sends, via the secure local connection, a user information request to the UMD 200 to release the vehicle information 80 (VIN, sensor information, and the like) or MIC user information 40 associated with a MIC 210. The RPS 101 verifies the MIC user information 40, received in response to the user information request, according to embodiments described more fully below.

Additionally, the RPS 101 of the stopped vehicle communicates with the FRV 400, e.g., via an automotive head unit or infotainment system of the FRV 400, to provide vehicle information 80 from the stopped vehicle 100 to the FRV 400. The vehicle information 80 corresponds to information about the vehicle such as VIN, sensor information, occupant status, vehicle description, operational vehicle status information or mechanical vehicle status information, regarding the status or use of vehicle equipment including usage telemetry, operational telemetry, or maintenance telemetry, or the like. This vehicle information 80 includes information 80 encoded in Electronic Control Units (ECUs) of the stopped vehicle 100, as well as vehicle information 80 generated by the stopped vehicle 100 (e.g., sensor information) or vehicle information 80 obtained by the stopped vehicle 100 from external sources (e.g., from the occupant's MIC 210 or an APS 300 such as the DMV). The vehicle information 80 from the stopped vehicle 100 informs the first responder of occupant status of the stopped vehicle 100 and enables the first responder to compare the provided vehicle information 80 against the observable characteristics of the stopped vehicle 100 (e.g., to determine whether the license plate has been swapped). Accordingly, the first responder enjoys improved safety by remotely obtaining and evaluating information about the stopped vehicle 100 and its passengers, while safely within the FRV 400. The first responder also enjoys efficient exchange of information with the stopped vehicle about the nature of the stop, information about a citation, and obtaining acknowledgement of the citation or obtaining vehicle status information pertinent to the citation.

Using the MIC environment 10 in these ways improves the overall vehicle stop experience for users and first responders by (1) notifying the first responder of other occupants presently or formerly in the stopped vehicle 100; (2) providing the ability for an occupant to share official, biographic, biometric and other MIC user information 40 (e.g., driver's license) and vehicle information 80 (which may include vehicle status information) without the first responder having to physically approach the stopped vehicle to obtain such documentation or information, thereby reducing the need for the first responder to request physical copies of such information; (3) supporting the automated pre-population of accident reports, citations, and the like, using the MIC user information 40 or vehicle information 80 provided automatically via the MIC environment 10, to avoid transcription errors or other data entry issues; (4) supporting the sending of a citation and related information to the stopped vehicle, obtaining denial or acknowledgement of the citation from the stopped vehicle, and obtaining the permissive release of vehicle status information relating to the citation, to facilitate issuance and acceptance of citations; and (5) eliminating the requirement for presentation of documents such as a physical driver's license and registration, enhancing the efficiency of the vehicle stop by avoiding problems associated with user-provided documentation. Furthermore, embodiments enhance the experience of the occupant or occupants of the stopped vehicle 100 by providing guidance or other reminders for best complying with the vehicle stop or the emergency, enhancing safety and setting expectations and alleviating potential escalations of the vehicle stop for the occupants or first responder.

Though vehicle stops in a first responder context are discussed throughout this application, the principles of this disclosure apply to other situations and environments.

Although MIC user information 40 may primarily be associated with official government information as in the case of driver's license information, the originating source of the information in a MIC is not restricted to official government information but may also include verified information from a non-governmental source. For example, a non-governmental third party may be the originating source of the information about an individual and the MIC may contain information corresponding to that found on employer-issued identification, or identifications issued by academic venues, commercial venues, and the like, such as student identifications or customer identifications. For example, a large commercial facility can make use of the MIC environment. Such facilities may issue their own MICs, or may provide information or privileges to be stored on existing (e.g., government-issued) MICs. In an embodiment, an employer or manager of the facilities grants facility-specific privileges to individuals associated with the facility, as indicated by MIC user information used in the facilities. Accordingly, a private LEO or security guard assigned to the facilities, when stopping a vehicle or individual on the facilities, can easily and efficiently access corresponding MIC user information as described herein (e.g., via vehicle-to-vehicle communications), even for large commercial facilities. The MIC environment provides similar benefits to any private venue involving security vehicles, such as large gated communities and the like. Such benefits are enabled by the MIC environment, independent of or in addition to government MIC environments.

The detailed description below elaborates on the foregoing, non-limiting embodiments, and on other embodiments not mentioned in this summary. Other features and aspects of the embodiments will become apparent to those of ordinary skill in the art from the following detailed description, which discloses, in conjunction with the accompanying drawings, embodiments that explain the features in accordance with the embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

DETAILED DESCRIPTION

In an environment that supports its use, a MIC 210 can enable a user to conveniently prove their identity. One embodiment of a MIC 210 is a mobile driver license (mDL) issued by an official agency such as a state department of motor vehicles (DMV). Another embodiment of a MIC 210 is a mobile passport. A mobile passport may, for example, be issued by the U.S. Department of State or a foreign ministry of another nation.

The MIC 210 itself is portable and can be provisioned to devices. Below, the device to which the MIC 210 is provisioned is referred to hereafter as a UMD 200. The term, UMD 200, pertains to any device to which a MIC 210 can be provisioned including, without limitation: smart watches, smart fitness bands, smart objects, smart phones, e-readers, tablet computers, smart televisions and displays, smart cameras, laptop computers, desktop computers, embedded computers, servers, chips, flash drives, and USB drives.

In one embodiment, the issuer of the MIC 210 (the MIC issuer) may provision the MIC 210 to the UMD 200, or work with a MIC provider to provision the MIC 210 to the UMD 200. In another embodiment, the MIC issuer may work with a third party to provision the MIC 210 to the UMD 200. In a further embodiment, the user may provision the MIC 210 from one device of the user to another device of the user (for example, from their desktop computer to their smart fitness band).

A MIC 210 may be verified by an authorizing party (AP). In one embodiment, the AP is an official agency such as a state DMV. In another embodiment, the AP is a third party empowered by an official agency to perform such authentication operations. The AP employs an APS 300. The APS 300 may provision the MIC 210 to the UMD 200.

The UMD 200 may interact with other devices to share some or all the content of the MIC 210. The device through which the UMD 200 shares the MIC user information 40 is referred to as an RPS 101. The RPS 101 is a system operated by or for a relying party (RP).

In embodiments, a given device or apparatus serves multiple different roles in the MIC environment 10. For example, a stopped vehicle may serve as a UMD configured to pass occupant identity information or vehicle information 80 to a first responder vehicle (hereinafter FRV) utilizing a Mobile Digital Terminal (MDT), Police Mobile Computer (PMC), Mobile Data Terminal ((MDT) or other in-vehicle laptop (computer) through which a first responder may retrieve vehicle license details, offender records, incident logs, vehicle tracking system information or other information. The FRV may serve as an RPS requesting the vehicle information 80 from the stopped vehicle 100. The stopped vehicle 100 then may serve as an RPS configured to request the MIC user information 40 from vehicle occupants, and then serve as a UMD to pass the MIC user information 40 from the stopped vehicle 100 to the FRV 400.

Figure 1:
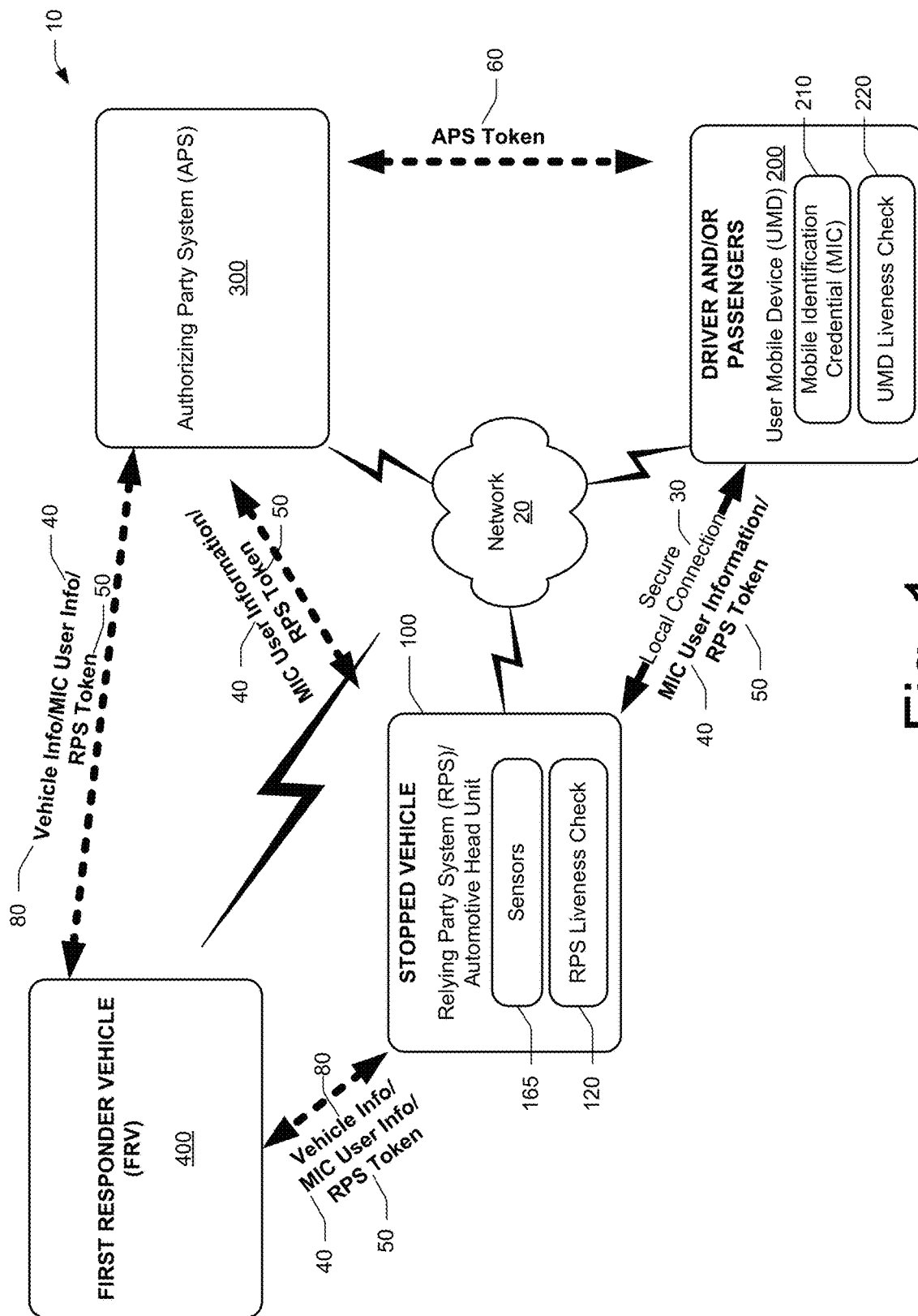
FIG. 1 illustrates a MIC environment including a stopped vehicle to remotely provide vehicle information and obtain MIC user information according to an embodiment.

FIG. 1 illustrates an embodiment of a MIC environment 10 including an RPS of the stopped vehicle 100, configured to pass vehicle information 80 to an FRV 400 according to an embodiment. The RPS also is configured to pass MIC user information 40 or an RPS token 50 to the FRV 400. The FRV 400 is configured to obtain authorization of vehicle information 80 or MIC user information 40. For example, after a privacy dialog in which the user of the UMD 200 consents to providing the vehicle information 80 or requested portion of MIC user information 40, the RPS may pass the MIC user information 40 or an RPS token 50 to the APS 300. The RPS may receive from the APS 300 an authentication, of the MIC user information 40, or may receive the MIC user information 40 itself. A similar approach may be used by the FRV 400 regarding the vehicle information 80 that is requested. The MIC environment 10 may thus supply or verify MIC user information 40 and the vehicle information 80, while allowing selective user consent to the release of such information.

Embodiments described herein increase the safety and efficiency of emergency personnel or first responder operations, such as dealing with stopped vehicles 100, by enabling the FRV 400 to remotely obtain passenger status of the stopped vehicle 100, and MIC user information 40 of vehicle occupants (regardless of whether a given occupant has a UMD 200). Embodiments also enable a vehicle occupant (referred to alternatively as user) of a stopped vehicle 100 to prove their identity using a MIC 210. In an embodiment, the user provides MIC user information 40 to their stopped vehicle's automotive head unit or infotainment system functioning as the RPS, which verifies the MIC user information 40 to verify that the user is authorized to operate the stopped vehicle 100. In another embodiment, the user provides MIC user information 40 to the FRV 400, by way of their stopped vehicle's automotive head unit or infotainment system functioning as the RPS 101, such as when complying with a request from the FRV 400 for the vehicle occupant to provide proof of driver's license privileges.

In one embodiment, the vehicle occupant uses a MIC 210 when initiating operation of the stopped vehicle 100 (e.g., when beginning travel, prior to involvement in an accident or traffic stop). In another embodiment, the vehicle occupant uses the MIC 210 when stopped and prompted by the FRV 400 within communication range of the stopped vehicle 100. The MIC 210 provides readily accessed, official biographic and biometric information, which reduces the need for network traffic at the FRV 400 (e.g., in offline contexts), and facilitates cross-checking of records at the APS 300, such as the DMV (e.g., in online contexts). Furthermore, the MIC 210 supports automated verification of the identity of the occupant at the stopped vehicle 100 via the automotive head unit functioning as the RPS 101, e.g., via RPS liveness check 120. Such automated identity verification of the occupant thereby improves general automotive safety, e.g., by preventing motor vehicle operation by drivers lacking sufficient driver privileges. In yet another embodiment, use of the MIC 210 enhances the vehicle occupant experience by providing helpful guidance for best complying with first responder instructions during a vehicle stop, information as to why the vehicle stop was initiated, providing a citation to the stopped vehicle along with relevant law enforcement information, providing vehicle information to the FRV, or eliminating a need for the vehicle occupants to interact personally with the first responder. In other embodiments, the MIC environment 10 enhances first responder activities, such as filling out accident reports or traffic citations. For example, the FRV 400 receives vehicle information 80 and MIC user information 40 relevant for completing a traffic citation, such as the vehicle occupant's identity and the vehicle information 80 enough to positively identify the stopped vehicle 100. The FRV 400 then pre-populates the first responder's citation system automatically using verified MIC user information 40 and vehicle information 80. Accordingly, transcription errors are minimized or eliminated completely. In yet another embodiment, the FRV 400 transmits to the stopped vehicle 100 an indication of why the FRV 400 pulled over the stopped vehicle 100, and transmits an electronic version of a citation or a record of information pertaining to the traffic stop. The stopped vehicle 100 may deny or acknowledge the citation via electronic communication with the FRV 400. The stopped vehicle 100 may selectively or permissively release vehicle information 80 including operational vehicle status information or mechanical vehicle status information, relating to the nature of the citation or why the stopped vehicle 100 was pulled over (e.g., to serve as evidence refuting the citation). Accordingly, multiple aspects of interactions associated with LEO traffic stops are performed accurately and efficiently, e.g., using the MIC environment.

As already discussed, an environment acts as a system that supports MIC use. To review, the vehicle occupants (of sufficient qualifying age) each have a MIC 210 such as a mobile driver's license (mDL) on their UMD 200 as part of MIC environment 10 that supports MIC 210 use. In such an environment, a MIC 210 is issued by an authorizing party, such as a state department of motor vehicles, using an APS 300. The APS 300 provisions the MIC 210 to the UMD 200. The APS 300 is available via network communication to interact with the RPS 101 and UMD 200 as described herein. The UMD 200 interacts with another device to share some or all the content of the MIC 210. The device that is to receive the MIC user information 40 is RPS 101.

Embodiments of the MIC environment 10 are compatible with multiple, different forms of identification (ID) and corresponding authorizing parties. For example, the MIC environment 10 supports non-governmental forms of ID, including those from private companies. Embodiments are compatible with forms of ID and their providers that are authorized by the DMV to provide or authorize credentials, such as Commercial Driver's Licenses (CDLs) or other driving privilege permits. Furthermore, embodiments are compatible with forms of employee IDs, used to prove employment status (e.g., by including a verifiable employee ID number) for operating fleet vehicles, such as delivery vans.

In this example environment, the RPS 101 is a stopped vehicle 100 that interacts with the user's UMD 200 to request information desired by the relying party, such as the FRV 400 (whose requests for MIC user information 40 are passed from the RPS 101 to the UMD 200). In an embodiment, the user selects whether to release requested MIC user information 40 or vehicle information 80, and has enough control to release the various types of information discretely—in whole or in parts selected by the user. When the user releases MIC user information 40 from the user's MIC 210, an RPS token 50 passes to the RPS 101 and an APS token 60 passes to the APS 300. The RPS 101 communicates with the APS 300, which compares the APS token 60 received from the UMD 200 to the RPS token 50 received from the RPS 101. Upon verifying a match, the APS 300 provides a copy of the MIC user information 40 to the RPS 101. When the user releases vehicle information 80 from the stopped vehicle 100, the infotainment system of the stopped vehicle 100 releases the vehicle information 80 to the FRV 400. A similar tokenization approach may be used to enable the FRV 400 to verify the vehicle information 80, but where the FRV 400 serves as an RPS, the stopped vehicle 100 serves as a UMD, and the stopped vehicle 100 sends the RPS token 50 to the APS 300 as an APS token 60. In such an approach, a vehicle manufacturer can serve as the APS 300, to verify the stopped vehicle's vehicle information 80 including the VIN number and proper format of collected sensor information. A DMV also can serve as the APS 300, e.g., to verify the stopped vehicle's registration information, registered owner information, license plate information, or other vehicle information or status stored at the DMV.

In embodiments, the RPS 101 uses digital signatures or encryption to obtain verification of MIC user information 40, and the MIC user information 40 is received from the UMD 200 instead of the APS 300. In another embodiment, the RPS 101 does not contact the APS 300 but uses a stored public key of the APS 300 to determine that the MIC user information 40 is trustworthy as received from the UMD 200. In another embodiment, the UMD 200 sends an RPS token 50 to the RPS 101 and sends an APS token 60 to the APS 300: the APS 300 releases the MIC user information 40 only if both the RPS token 50 and the APS token 60 are received and only if within a given timeframe. In another embodiment, the RPS 101 or the UMD 200 conducts an RPS liveness check 120 or a UMD liveness check, 220 to confirm that the user in possession of the UMD 200 matches the MIC 210 provisioned on that UMD 200. In yet another embodiment, the APS 300 facilitates the RPS liveness check 120 or UMD liveness check, 220 performed by the RPS 101 or the UMD 200, e.g., by processing information collected by the RPS 101 or UMD 200 as part of the RPS liveness check 120 or the UMD liveness check 220.

In one embodiment, the FRV 400 initiates communication with the automotive head unit or vehicle operating system, generally referred to as the infotainment system of the stopped vehicle 100, e.g., via Wi-Fi, to remotely obtain vehicle information 80 when within range of the stopped vehicle 100. The infotainment system of the stopped vehicle 100 can access information from the engine computer (EC), generally referred to as the electronic control module (ECM), electronic control unit (ECU) or powertrain control module (PCM). In this embodiment, the MIC 210 of the vehicle occupant is an mDL issued by the user's DMV. The FRV 400 acts as an RPS to make a request for vehicle information 80 from the infotainment system of the stopped vehicle 100 acting as a UMD. The FRV 400 verifies information via the DMV serving as the APS 300. In an embodiment, the DMV checks whether the vehicle information 80 indicates a problem with the status of the stopped vehicle 100, such as suspended plates.

In one embodiment, at the time of the vehicle-to-vehicle communication, the FRV 400 requests the MIC user information 40 from the stopped vehicle 100. The infotainment system of the stopped vehicle 100 has a dialog with the vehicle occupant via the UMD 200 of the vehicle occupant, which is locally and securely linked, in an embodiment, via Bluetooth, RFID, near-field, or the like. In an embodiment, the infotainment system of the stopped vehicle 100 establishes the dialog with the user by presenting a QR code which the UMD 200 scans to establish a secure local (close-proximity) connection, between the UMD 200 and the infotainment system or the automotive head unit functioning as the RPS 101, using respective local connection circuitry. The user is prompted by the UMD 200 to consent to the release of their MIC user information 40 to the automotive head unit functioning as the RPS 101, informing the user that the consent is requested by the FRV 400. The MIC user information 40 is releasable directly from the UMD 200 or indirectly from the APS 300. In an online mode embodiment, the automotive head unit functioning as the RPS 101 interacts with the APS 300 to verify the released MIC user information 40. In an offline mode, the automotive head unit functioning as the RPS 101 uses a public key from the APS 300 to verify the released MIC user information 40. The automotive head unit functioning as the RPS 101 or the UMD 200 performs an RPS liveness check 120 or a UMD liveness check 220. For example, by comparing collected biometric information to verified credentials. The automotive head unit functioning as the RPS 101 then passes the released MIC user information 40 to the FRV 400.

In an embodiment, the FRV 400 compares collected MIC user information 40 (including biographic information or biometric information) against first responder records, such as law enforcement records. In an embodiment, such comparison is made via a first responder back end. The first responder back end may be a remote server from which information may be queried through the use of information obtained from the stopped vehicle. Example information repositories on such back ends comprise information from sources such as a State DMV or other database of personally identifiable information (PII) or information relevant to the identification of the stopped vehicle itself or the vehicle's occupant(s). Because the collected MIC user information 40 is accurate and verified, the likelihood of mistaken identity is greatly reduced or eliminated, avoiding potential mistakes such as arresting the vehicle occupant for another person's outstanding warrant.

In an embodiment, data transfers are digitally signed, via electronic certificates, to verify the data transfers. In another embodiment, in addition to or instead of the use of digital signatures for verification, data transfers are encrypted via public-key cryptography to ensure integrity of the data transfers. In yet another embodiment, data transfers utilize tokenization to safeguard online data transfers. Other embodiments rely on combinations of multiple such data protection procedures, as well as other data security best practices.

In some embodiments, secure local or remote connections are established by using session keys. Embodiments can use various approaches for handling session keys, including the use of ephemeral keys. For example, at initial engagement, a first device, denominated herein as Device 1, will pass its session public key to a second device, denominated herein as Device 2. Device 2 will use its private key and the public key of Device 1 to generate the public key for Device 2. The public key for Device 2 is shared with Device 1. These ephemeral key pairs are used to encrypt and to decrypt messages sent between Device 1 and Device 2. A session begins when the two devices acknowledge each other and open a virtual connection. A session ends when the two devices have each obtained the needed information and have sent "finished" messages, terminating the connection.

In an embodiment, the stopped vehicle's automotive head unit or infotainment system, in the role of an RPS 101, is configured to selectively allow specific units such as UMD 200 to connect. For example, the RPS 101 is configured to obtain vehicle information 80, and determine a registered owner corresponding to the vehicle information 80. The RPS 101 then allows a UMD 200 to connect and checks whether the MIC 210 of the UMD 200 matches the registered owner. If the MIC 210 does not match the registered owner, the RPS 101 disconnects the UMD 200. In embodiments, the RPS 101 communicates with the vehicle's automotive head unit to disable some or all functionality of the stopped vehicle 100. In an embodiment, the RPS 101 determines that the UMD 200 corresponds to an authorized student driver and directs the vehicle's automotive head unit or infotainment system to disable the radio, limit top speed, and otherwise place the vehicle into a student driver mode. Similar approaches enable the RPS 101 of the stopped vehicle 100 to require the UMD 200 to connect and identify vehicle occupant privileges of the MIC 210 provisioned on the UMD 200. The RPS 101 then limits use of the stopped vehicle according to the corresponding vehicle occupant privileges from the UMD 200. In such embodiments, the RPS 101 includes an RPS liveness check 120 to ensure that the vehicle occupant matches the MIC 210.

In another embodiment, the RPS 101 includes a permission mode, whereby the RPS 101 directs the vehicle's automotive head unit to enable or disable the vehicle based on the identity corresponding to the MIC 210 that is verified with the vehicle. For example, the RPS 101 is programmed to accept a MIC 210 pertaining to a person on a list of drivers having permission to operate the vehicle. In another embodiment, the RPS 101 consults with an APS 300 of an insurance company and determines whether a MIC 210 is that of an individual sufficiently covered or otherwise permitted to operate the vehicle. Accordingly, embodiments of the RPS 101 are configured to seek user information or vehicle information regarding driver privileges from sources beyond the MIC 210, such as an APS 300 of the state DMV, and also check for dynamically changing privileges that are not necessarily indicated by the MIC 210 (e.g., when insurance records indicate the user is temporarily barred from driving while healing from an eye injury that prohibits safe driving).

In other embodiments, the UMDs 200 of occupants in the stopped vehicle 100 are enabled to communicate electronically with the stopped vehicle's automotive head unit or infotainment system by way of an app. In a variation, the stopped vehicle's automotive head unit or the UMD 200 of the driver vehicle occupant displays a QR code that other vehicle occupants use to download an app that permits them to electronically communicate.

The stopped vehicle's automotive head unit or infotainment system, serving as the RPS 101 in the MIC environment, obtains the MIC user information 40, which is trustworthy, such as the vehicle occupant's name, date of birth, and driving privileges. In an online mode, the RPS 101 queries an authorizing party system (i.e., APS 300), to request MIC user information 40 as known by the APS 300. In offline mode, the RPS 101 directly obtains the MIC user information 40 from the UMD 200. Accordingly, the stopped vehicle's automotive head unit serving as an RPS 101 in the MIC environment collects the MIC user information 40, which is trustworthy. The stopped vehicle's automotive head unit is configured to pass the MIC user information 40, which is trustworthy, to the FRV 400, without a need for the first responder to exit the FRV 400 or risk transcription errors sometimes associated with manual collection of such information.

Embodiments enable various benefits relating to vehicle stops performed by FRVs 400, such as those operated by LEOs. The MIC environment provides for the use of MIC user information 40, as communicated between vehicles as described above, and provides for information exchange relating to the vehicle stop or citation. In an embodiment, communication with the vehicle occupant is facilitated through an app on the occupant's UMD 200. The MIC environment can make use of an instant app feature of a smartphone architecture, enabling rapid setup of smartphone communication for the vehicle occupant without spending time on a full app install. The FRV 400 may bear a marking or indicia (e.g., on an exterior of the FRV 400) that is visible to the stopped vehicle's occupant upon being pulled over. The notice advertises that the FRV 400 supports electronic communication capability, via the MIC environment. In an embodiment, the vehicle occupant may receive a text message or other communication from the FRV 400. In an embodiment, the FRV performs a lookup of the stopped vehicle's license plate number to access a text phone number provided by the registered owner, and the FRV sends a text message to that number as a form of initiating contact with the stopped vehicle's occupant. The communication may include website information, e.g., linking to the relevant police department or the instant app for enabling app-based interactions by the stopped vehicle (via the vehicle occupant's app communicating with the stopped vehicle's automotive head unit or infotainment system). In an embodiment, the communication from the FRV 400 is in the form of a token including such information and information identifying the police as the source of the token.

Embodiments enable the FRV 400 to use the MIC user information 40 for efficient user identification and pre-population of citation information. The embodiments described herein can use such features to provide additional enhancements and improvements to electronic platforms or electronic ticketing systems. In an embodiment, the enhancements include the ability to transmit information, such as the information relevant to the citation, to the vehicle occupant. Communications may be relayed from vehicle to vehicle, remaining device agnostic regarding different types of UMDs 200 that vehicle occupants may carry. Vehicle occupants may receive or permissively authorize release of identity information, vehicle information, and the like via the stopped vehicle 100, e.g., via a touchscreen of the stopped vehicle's automotive head unit or infotainment system, or a UMD 200 in communication with the stopped vehicle's automotive head unit or infotainment system.

The vehicle information 80 may include information generated by the stopped vehicle's automotive head unit, infotainment system, main central processing unit (CPU), and the like. The vehicle information 80 may include vehicle status information, such as operational vehicle status information or mechanical vehicle status information. Such vehicle status information indicates whether vehicle equipment has been operated, and indicates a mechanical condition of vehicle equipment. The vehicle status information contains, e.g., data relating to turn signal status, brake application data, and other usage telemetry, operational telemetry, or maintenance telemetry, and the like. The vehicle's occupant has selective control over which particular vehicle information 80 is released, similar to the vehicle's occupant having selective control over which MIC user information 40 is released as described herein. In an embodiment, the vehicle's occupant responds to a prompt from the FRV 400 requesting vehicle information 80 specifically limited in time and scope to the current interaction between the FRV 400 and the stopped vehicle 100.

In an illustrative permissive example, the FRV 400 pulls over the stopped vehicle 100 for failure to use a turn signal. The FRV 400 uses the license plate number of the stopped vehicle 100 to initiate vehicle-to-vehicle communications in the MIC environment as described herein. The FRV 400 transmits an explanation to the stopped vehicle 100, indicating why the stopped vehicle 100 was pulled over. The FRV 400 also transmits an identifying record of the interaction, including identification of the LEO, their precinct, their office, their badge number, a citation number, and other such information to provide a record of accountability for the interaction. The FRV 400 requests the release of identity information from the stopped vehicle 100, which can be permissively obtained under the MIC environment as described herein. In an embodiment, establishing occupant identity can include a liveness check to verify the occupant. The liveness check may be performed by the LEO, whose FRV 400 electronically receives a photograph along with other occupant identity information, corresponding to the mobile ID being used by the stopped vehicle's occupant during the interaction. The LEO may then physically approach the stopped vehicle 100 to look at the vehicle occupant, and compare the occupant's appearance to the photograph received via the MIC environment. The FRV 400 also may request vehicle information 80 that is limited in time (e.g., for the past fifteen minutes, relevant to turn signal usage prior to stopping the vehicle) and scope (e.g., mechanical condition of the turn signal along with operational information or telemetry data on whether the turn signal has been used). Such limitations preserve the civil liberties of the occupant, and ensure that the requested information corresponds to the citation, such as the failure to use a turn signal.

By contrast, in non-permissive situations such as emergencies, the FRV 400 can issue an emergency override to obtain emergency information as described herein, without needing to obtain occupant permission. An emergency override may depend on the situation satisfying specific criteria, or may be based on the FRV 400 submitting a request to another authority, such as when requesting a search warrant.

For this permissive example, the FRV 400 also issues a citation electronically regarding failure to use a turn signal. The stopped vehicle 100 prompts vehicle's occupant for permission to selectively release the requested vehicle information 80 or MIC user information 40. The stopped vehicle 100 also prompts the vehicle's occupant for electronic acknowledgement, acceptance, or denial of the received citation. The occupant also may respond by challenging all or part of the citation, and may selectively withhold or authorize release of information accordingly. In an embodiment, the occupant may use the MIC environment to digitally sign the citation as a form of acknowledgement sent to the FRV 400.

The stopped vehicle's occupant directs the stopped vehicle 100 to deny or release such information or acceptance, e.g., via the stopped vehicle's infotainment system, or via an app on the vehicle occupant's UMD 200 in communication with the stopped vehicle's infotainment system. The vehicle's occupant has selective control over which particular information to release, and may separately release identity information, vehicle information, or citation acknowledgement or denial. The FRV 400 receives acknowledgement of the citation, along with vehicle information 80 supporting or refuting the citation. For example, such information may indicate that the stopped vehicle's turn signal is inoperative, and that the turn signal has been used consistently prior to the vehicle being stopped, despite the turn signal being inoperative. The FRV 400 may store the vehicle information 80 (locally, or by transmitting the information for storage at a remote server) as evidence pertaining to the citation. In an embodiment, such stored vehicle information 80 may indicate that the turn signal was operational but not used, and may serve as evidence supporting, e.g., a citation for driving under the influence, and probable cause for the stop due to lack of proper vehicle operation. Accordingly, embodiments enable the collection of evidence that is not easily perceived by the LEO, but that is pertinent to supporting or disproving a given citation. In an example scenario, a vehicle occupant may provide evidence showing that the vehicle's brakes were applied prior to an accident, refuting a witness statement claiming to have not seen actuation of the brake lights, or the absence of tire skid marks.

As described above, the citation is provided to the occupant electronically, and the occupant provides a signature acknowledging the citation electronically. Accordingly, resources and labor do not need to be expended in printing physical tickets, physically presenting tickets for signature, or manually signing and collecting physical tickets. Such transactions may be accomplished without the LEO needing to exit the FRV 400, and embodiments described herein generally increase safety by reducing the need for physical interactions. Furthermore, relevant evidence may be collected as part of the citation process, or the general interaction with the FRV 400 even if no citation is issued.

As mentioned above, the FRV 400 may display a marking or indicia on an exterior of the FRV 400, indicating that the FRV 400 is capable of wireless transmission of information such as an electronic driver's license, or that the FRV 400 is compatible with the MIC environment described herein. Such an indication is positioned to be visible to the stopped vehicle's occupant, and informs the occupant to check their stopped vehicle's infotainment system or UMD 200 for interacting electronically. In an embodiment, such a marking or indicia may be provided within the stopped vehicle 100 or its infotainment system. Thus, the stopped vehicle 100 may display an indicator such as a logo or picture that serves as a constant reminder to the occupant that the stopped vehicle 100 has such compatibility.

Embodiments may employ guidance or constraints on how information is released or used. In an embodiment, the MIC environment provides notices advising the occupant before release of information, such as "Refusing to release this information will not be construed as evidence of guilt." In another embodiment, the MIC environment performs a check to ensure that the stopped vehicle is not in motion before prompting the occupant for information or obtaining information from the stopped vehicle. The MIC environment may confirm that the FRV 400 has performed a vehicle stop before allowing the FRV 400 to request or otherwise obtain information from the stopped vehicle 100. Thus, embodiments may prevent the FRV 400 from constantly pulling data from random vehicles, ensuring the protection of civil liberties of the general public.

In an embodiment, the MIC environment provides later, additional opportunities for the occupant to provide information or otherwise interact with aspects of the initial interaction. The occupant may, e.g., accept or challenge the citation, after the time of the initial interaction with the FRV 400. As explained above, initially at the time of a stop, the FRV 400 may issue a citation to the stopped vehicle's occupant. The occupant may acknowledge receipt of the citation, and the FRV 400 can record the citation acknowledgement with the occupant's verified identity information. Embodiments enable the FRV 400 to also provide a token or website link to allow for later interactions related to the citation, over an extended period of time. In an embodiment, the FRV 400 provides notice to the stopped vehicle 100 of a 15-day period to visit the website or otherwise use the token provided by the FRV 400 to challenge or otherwise interact with the citation. Within the timeframe for challenging the citation, the occupant may provide information pertaining to the citation, such as the vehicle information 80. In an embodiment, the occupant may provide such information from their vehicle, e.g., by connecting their vehicle's infotainment system to the Internet (whether connected directly or via a UMD 200) and accessing the token or website for the transaction using the vehicle's connection. In an embodiment, the token or website informs the vehicle's infotainment system as to what vehicle information 80 is relevant to the citation, constrained as described above regarding relevance and time period. Similarly, the embodiment informs the user as to such information, and prompts the user to selectively release the vehicle information 80 identified as relevant to the citation. Released vehicle information 80 may be collected by a remote server that matches the information to the citation, interaction, or transaction from the earlier vehicle stop.

Figure 2:
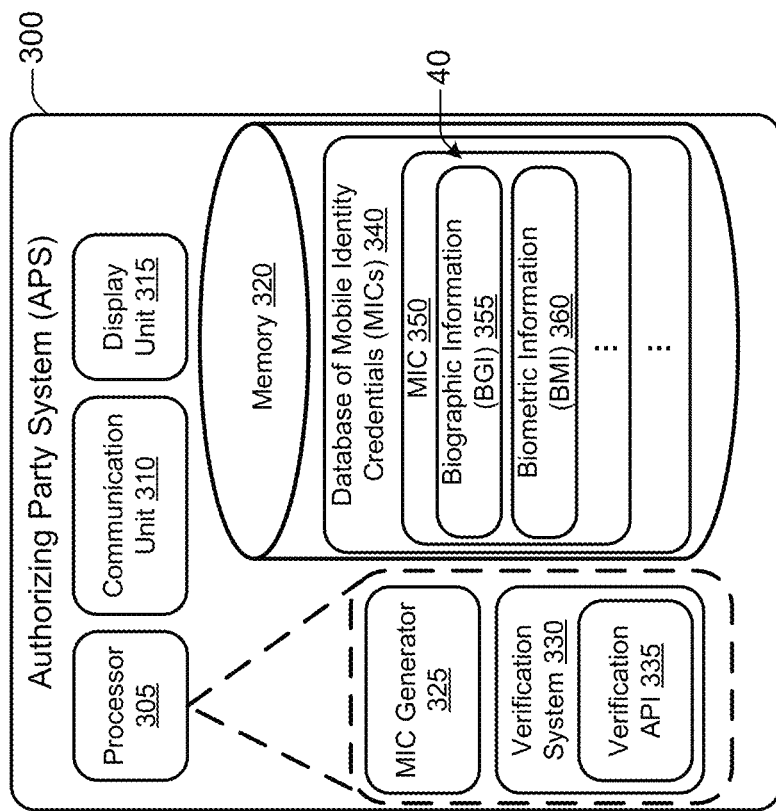
FIG. 2 illustrates an APS according to an embodiment.

FIG. 2 illustrates an APS 300 according to an embodiment. The APS 300 includes a processor 305, communication unit 310, display unit 315, and memory 320. The processor 305 is associated with logic or modules to process information, including a MIC generator 325 and a verification system 330 with a verification application programming interface (i.e., verification API 335).

The MIC generator 325 enables the APS 300 to generate a MIC 350 for a given user. For example, the MIC generator 325 receives unique information about the user, such as a social security number. The APS 300 can reside in a local DMV office staffed with agents to verify physical documents in person, to traditionally verify that the social security number belongs to that user. The MIC generator 325 creates a framework to build the MIC 350 for the user and populates the MIC 350 with biographic information (i.e., BGI 355) and biometric information (i.e., BMI 360), e.g., as available locally at the DMV office. In embodiments, the MIC generator 325 populates the MIC 350 with other information corresponding to the user, such as driving privileges. Generated MICs 350 are stored at the memory 320 of the APS 300 and available for provisioning onto the UMD 200 of the user. In an embodiment, a given APS 300 provisions multiple different MICs onto the UMD 200, e.g., at an APS 300 that provides an mDL and employment IDs.

The verification system 330 of the APS 300 is configured to interact with an RPS 101, such as when handling requests received from an RPS 101 for MIC user information 40. In the illustrated embodiment, the verification system 330 uses a verification API 335 to handle interactions in a standardized computing format. In another embodiment, the verification system 330 is configured to interact with a UMD 200, e.g., to provision a (provisioned) MIC 210 onto the UMD 200 or receive RPS tokens 50 from the UMD 200. In yet another embodiment, the verification system 330 is configured to interact with other systems to verify information. Such other systems include other APSs including government entities, trusted certificate holders, open ID providers, back ends, and the like.

In an embodiment, the verification system 330 is configured to receive an APS token 60 from the UMD 200, and an RPS token 50 from the RPS 101. The verification system 330 then compares the tokens to determine whether the tokens match and were received within an acceptable timeframe. In an embodiment, matching tokens indicates that the RPS 101 is trustworthy regarding UMD consent and MIC user information 40.

The memory 320 is associated with a database of MICS 340. A given MIC 350 includes BGI 355 and BMI 360.

The MIC 350 generally is structured to securely and discretely store various fields comprising the BGI 355 and BMI 360. For example, the BGI 355 includes first name, last name, date of birth, sex, address, identifier number, organ donor status, and the like. In an embodiment, the BMI 360 includes a digital photograph, a digital image representing a QR code containing the BGI 355, a digital fingerprint representation, a digital retina representation, and the like.

In embodiments, the MIC 350 includes other information (see FIG. 4), such as privileges. The structure of the MIC 350 enables the other information to be added, such as when provisioning the MIC 350 from the APS 300 to a UMD 200, or after provisioning the MIC 350 to the UMD 200, such as when the user enters information into the MIC 350 via the UMD 200. Information on the MIC 350 is compartmentalized and independently accessible.

Figure 3:
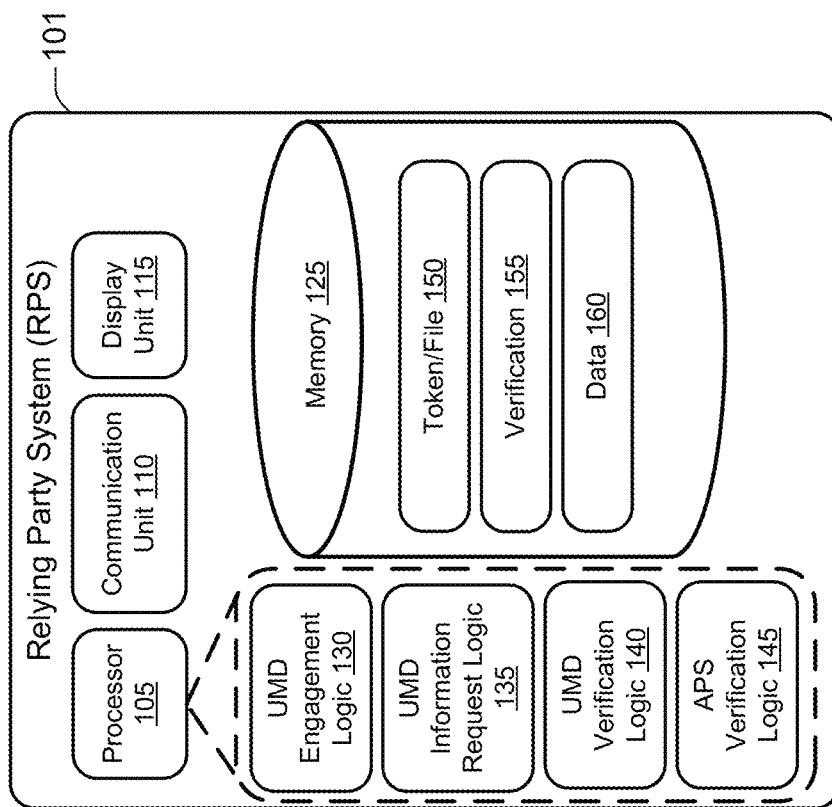
FIG. 3 illustrates an RPS according to an embodiment.

FIG. 3 illustrates RPS 101 according to an embodiment. The RPS 101 includes a processor 105, communication unit 110, display unit 115, and memory 125. The processor 105 is associated with logic or modules to process information, including UMD engagement logic 130, UMD information request logic 135, UMD verification logic 140, and APS verification logic 145. Although not specifically illustrated, embodiments of the RPS 101 include hardware to collect information to perform a liveness check of the user, such as a camera, fingerprint reader, retina reader, and the like.

The UMD engagement logic 130 is adapted to enable the RPS 101 to establish a secure local connection with an external device (such as the user's UMD 200) via a communication controller. For example, the UMD engagement logic 130 establishes a key exchange protocol usable by the UMD 200, via radio frequency or visual communications. In an embodiment, the UMD engagement logic 130 encodes a public key in an optically readable QR code and displays the QR code to the UMD 200. Upon reading the QR code, the UMD 200 responds to the RPS 101 with a key exchange to secure a local connection between the RPS 101 and the UMD 200. In embodiments, the secure local connection utilizes protocols such as secure Near Field Communication (NFC), secure Bluetooth, secure Wi-Fi, or the like.

The UMD information request logic 135 is configured to enable the RPS 101 to structure and to send the external device, such as the UMD 200, a user information request message seeking official information associated with a mobile identification credential and to transmit that request to the UMD 200 via the secure local connection. The request for consent includes a request for the types of user information which the relying party is requesting by way of the RPS 101. For example, the request for consent includes a request for the user's date of birth.

The UMD verification logic 140 is configured to enable the RPS 101 to verify whether user information received from the UMD 200 is authentic. In an embodiment, the RPS 101 accesses an electronic certificate from the APS 300 to verify the authenticity of the MIC user information 40 received from the UMD 200. The UMD 200 digitally signs the MIC user information 40 using the electronic certificate from the APS 300. In an embodiment, the UMD 200 retrieves the electronic certificate at the time of the transaction, either from the APS 300 or from a certificate repository. In another embodiment, the RPS 101 accesses a copy of the electronic certificate stored locally at the UMD 200, and periodically refreshes the locally stored electronic certificates independently of a given transaction. In another embodiment, the verification logic is adapted to send an APS a token received from the external device, such as UMD 200, which the APS will reply to by sending the official information (i.e., the MIC user information 40).

In some instances, the RPS 101 does not have to submit anything to the APS 300 to obtain a public key. In an embodiment, the RPS 101 periodically checks with the APS 300 to refresh the public keys. In some cases, there may be a public key distributor (PKD). The distributor would be an agent acting on behalf of several trusted entities. This agent would hold the most up-to-date public keys and distribute to trusted relying parties such as RPS 101. In yet other embodiments, when something other than a public key is used to verify the MIC user information 40, the RPS 101 will need to submit an electronic document or a digital file or the like to the APS 300 in exchange for a key that may be referred to as an authentication key that is not public. In an embodiment, the authentication key is a public key that refreshes after a very short time, thereby requiring the RPS 101 to reach out to the APS 300 when it is time to verify the information and use the public key with a short lifespan before it expires. In other embodiments, cryptography is based on private key pairs.

The APS verification logic 145 is configured to enable the RPS 101 to verify whether MIC user information 40 received from the APS 300 is authentic. The RPS 101 accesses an electronic certificate authorized by the APS 300, whether stored locally or offline, to cryptographically verify authenticity of the official information received from the APS 300 that is digitally signed by the certificate used by the APS 300. In other words, the APS verification logic is adapted to receive the official information and to cryptographically verify authenticity of the official information.

The memory 125 is associated with a token or file 150, a verification 155, and data 160. The RPS 101 receives the token or file 150 from the UMD 200, and the RPS 101 is configured to pass the token or file 150 to the APS 300. Thus, the RPS 101 exchanges the token or file 150 at the APS 300 to receive MIC user information 40. The verification 155 represents a positive confirmation, via the use of electronic signatures or cryptography, that received MIC user information 40 (whether from the APS 300 or the UMD 200), is authentic. The data 160 represents the received MIC user information 40.

Figure 4:
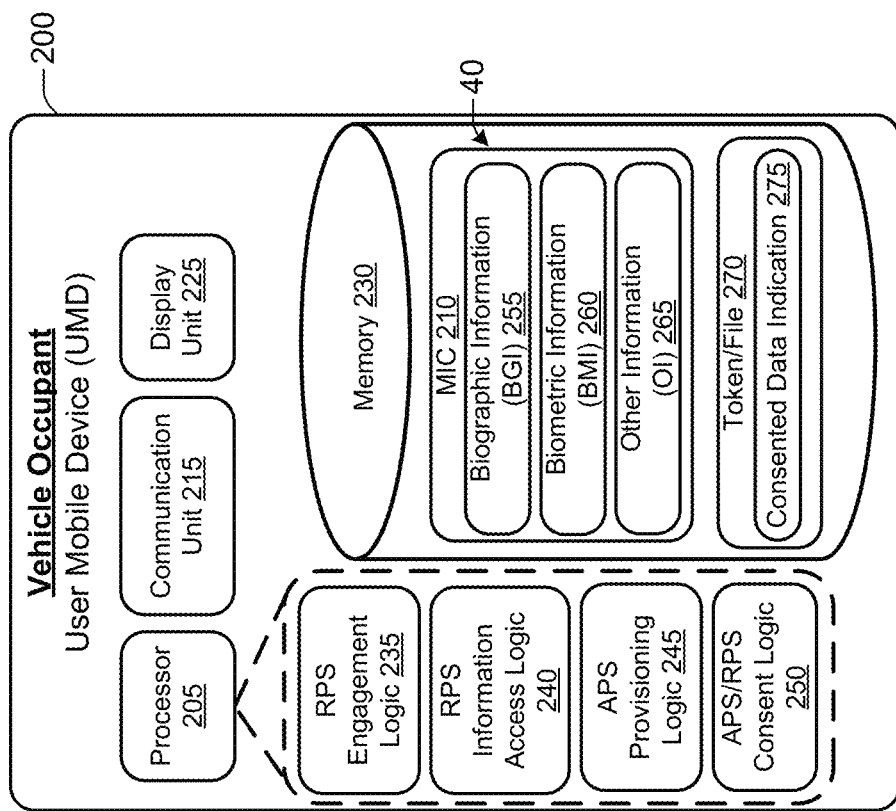
FIG. 4 illustrates a UMD according to an embodiment.

FIG. 4 illustrates a UMD 200 according to an embodiment. The UMD 200 includes a processor 205, communication unit 215, display unit 225, and memory 230. The processor 205 is associated with logic or modules to process information, including RPS engagement logic 235, RPS information access logic 240, APS provisioning logic 245, and APS or RPS consent logic 250.

In an alternate embodiment, the UMD 200 includes removable memory, such as a universal serial bus (USB) flash memory unit or micro secure digital (SD) flash memory card. In such embodiments, the memory 230 of the UMD 200, which contains a provisioned MIC 210, is separable from the UMD 200 or combinable with a different UMD. In another embodiment, a memory itself serves as the UMD 200. In such embodiments, a user carries a portable memory in UMD 200 containing the user's MIC 210 or user consent token or files 270. Such a portable memory in UMD 200, in embodiments, is a portable USB flash drive. To conduct a transaction or otherwise provide identification, the user inserts the portable memory into an RPS 101, which interprets the insertion as proximal consent to read the MIC user information 40 (whether directly from the memory 230 to the RPS 101 in an offline mode, or indirectly by retrieving a user consent token from the portable memory and forwarding that token to an APS 300 from which the RPS 101 receives MIC user information 40). In yet another embodiment, the UMD 200 comprises a code, such as an electrically readable code via magnet, RFID, and the like, or an optically readable code such as barcode, QR code, and the like. In such embodiments, the user conducts a transaction or otherwise provides identification by presenting the code to an RPS 101 including a reader compatible with the code's format. In an embodiment, the RPS 101 includes a keyboard that the user uses to manually type the code. In another embodiment, the RPS 101 includes a card reader to read the code contained in or on a card-format UMD, whether electronically, magnetically, or optically encoded on the card. The RPS reader can verify such identities by using those forms of identity to retrieve biometric information from the APS 300 and performing a comparison with the user to verify that the user belongs to that MIC 210.

The RPS engagement logic 235 is configured to enable the UMD 200 to establish the secure local connection with the RPS 101, as set forth above with respect to the description of FIG. 3.

The RPS information access logic 240 is configured to enable the UMD 200 to allow access by the RPS 101 to MIC user information 40 associated with the MIC 210 (whether stored at the UMD 200 for offline mode access or stored at the APS 300 for online mode access). In the context of allowing access to MIC user information 40 stored on the UMD 200, passive access involves the UMD 200 enabling the RPS 101 to read data from the UMD 200. Active access involves the UMD 200 transmitting data to the RPS 101. Allowing access furthermore includes the UMD 200 authorizing release of MIC user information 40 from the APS 300 to the RPS 101, which similarly involves passive or active access between the RPS 101 and the APS 300. The RPS information access logic 240 is responsive to the UMD information request logic 135, as set forth above with respect to the description of FIG. 3.

The APS provisioning logic 245 is configured to enable the UMD 200 to receive a MIC 210 from the APS 300 and store the received MIC 210 securely on the UMD 200. The APS provisioning logic 245 is responsive to the MIC generator 325 as set forth above and as described with respect to FIG. 2. In an embodiment, the APS provisioning logic 245 communicates with the APS 300 to indicate readiness for provisioning the MIC 210 from the APS 300 onto the UMD 200. In embodiments, the APS provisioning logic 245 is configured to provision multiple MICs onto the UMD 200. For example, the APS provisioning logic 245 provisions a first MIC corresponding to an mDL, and a second MIC corresponding to an employment ID. The UMD 200 stores the MIC 210 in the memory 230 as illustrated, including the various information of the MIC 210 such as the BGI 255, BMI 260, and other information (i.e., OI 265).

The APS or RPS consent logic 250 is configured to enable the UMD 200 to receive requests for the consent and release of MIC user information 40 and generate corresponding compartmentalized or discrete prompts for the user's consent to selectively indicate approval to release such MIC user information 40. In an embodiment, the APS or RPS consent logic 250 is configured to interact with the UMD information request logic 135, as set forth above and described with respect to FIG. 3. In an embodiment, the APS or RPS consent logic 250 receives the user's selective consent and sends the consent to the APS 300 whereby the APS 300 acts in accordance with the consent. In another embodiment, the APS or RPS consent logic 250 receives the user's selective consent and directs the UMD 200 to selectively release the MIC user information 40 in accordance with the consent.

The memory 230 is associated with at least one MIC and token or file 270. The MIC 210 includes BGI 255, BMI 260, and OI 265. The token or file 270 includes a consented data indication 275. In an offline embodiment, the APS or RPS consent logic 250 obtains consent and transmits the requested portion (or all) of MIC user information 40 including BGI 255, BMI 260, or OI 265 (e.g., using a secure communication link and an authentication protocol to digitally sign the requested information) from the UMD 200 to the RPS 101. In an online embodiment, the APS or RPS consent logic 250 obtains consent and transmits, to the APS 300, the token or file 270 (as stored in the memory) which contains a consented data indication 275. The token or file 270 does not actually contain the requested portion of MIC user information 40. Rather, the token or file 270 includes the consented data indication 275 which indicates which of the user's MIC user information 40 is authorized for release by the APS 300. Such consented data indication 275 is used by the RPS 101. The RPS 101 passes the received consented data indication 275 (e.g., as an RPS token) to the APS 300, which exchanges the token or file 270 for the MIC user information 40 at the APS 300 that is consented to be released. The APS 300 then releases to the RPS 101 (e.g., allows access by the RPS 101) the consented MIC user information 40.

Figure 5:
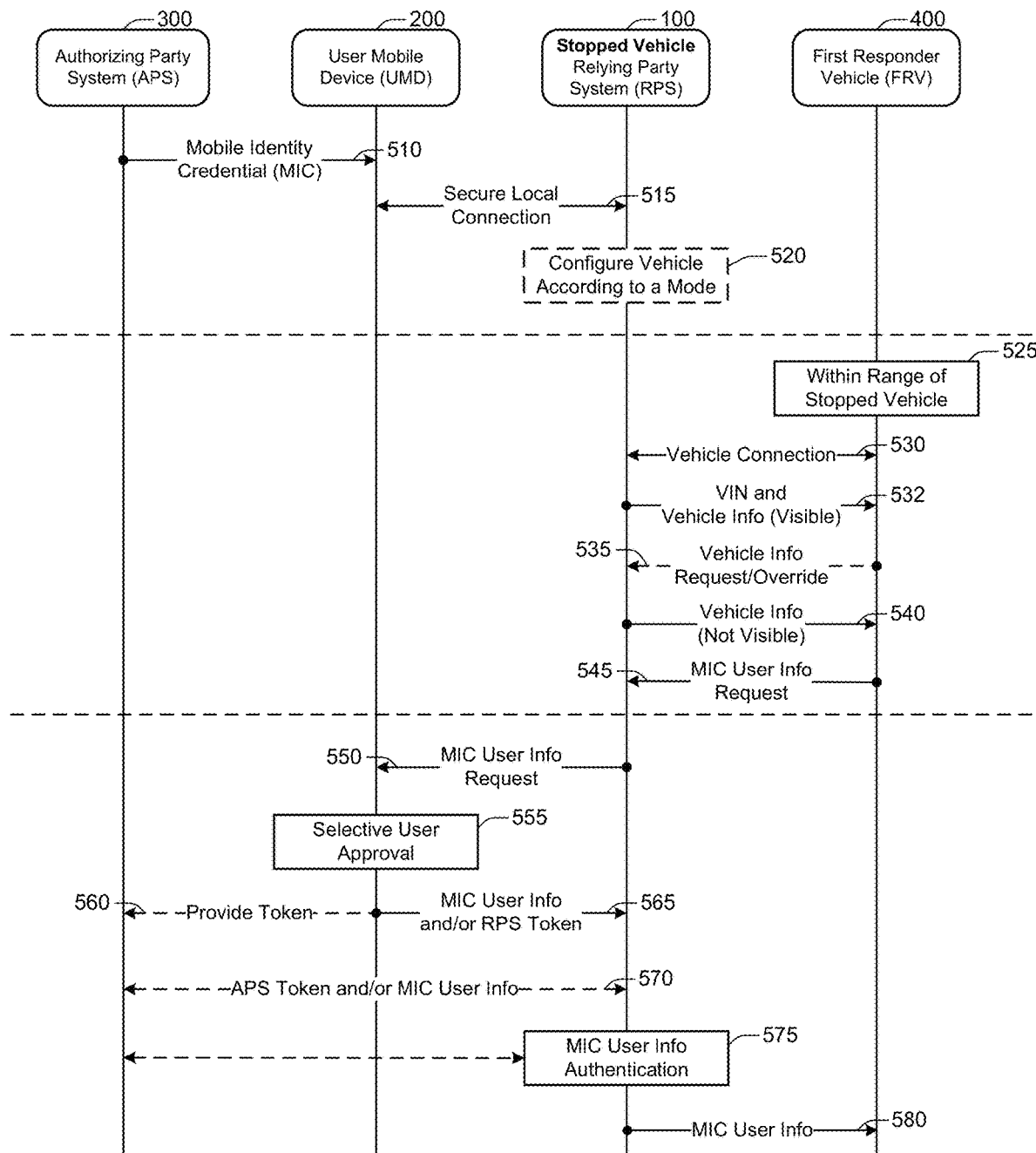
FIG. 5 illustrates steps to remotely obtain vehicle information and MIC user information from a stopped vehicle according to an embodiment.

FIG. 5 illustrates steps to remotely obtain vehicle information and MIC user information from an infotainment system of a stopped vehicle 100 according to an embodiment, based on communications between an APS 300, UMD 200, RPS 101, and FRV 400. Initially, the APS 300 provisions 510 a MIC onto the UMD 200. For example, a user brings their UMD 200 to a local DMV. The DMV performs a manual in-person verification of the user's identity and confirms that the UMD 200 is compliant with the MIC environment. The user then drives their vehicle (referred to as the stopped vehicle 100) and establishes 515 a secure local connection between their UMD 200 and their vehicle, e.g., via an automotive head unit or infotainment system functioning as the RPS 101 of the stopped vehicle 100.

To establish 515 the secure local connection, in an embodiment, the user interacts with the RPS 101 by using the UMD 200 to perform an initiation with the RPS 101. The UMD 200 and RPS 101 perform a handshake establishing a secure local connection between the UMD 200 and RPS 101. The handshake and secure local connection are implemented according to various embodiments and are initiated by either device. In an embodiment the handshake is based on OpenID Connect. In an embodiment, the RPS 101 includes a Radio-Frequency Identification (RFID) reader and the initiation is based on RFID. The user places the UMD 200 on the RFID reader of the RPS 101, and the RFID reader detects the UMD 200. Such detection is treated as user-initiation of the handshake and proximal consent from the user to the RPS 101, to allow the RPS 101 to perform the handshake with the UMD 200. During the handshake, the UMD 200 and the RPS 101 establish a secure local connection, enabling the RPS 101 and UMD 200 to exchange information securely. In another embodiment, the handshake and connection are based on Wi-Fi Aware.

In embodiments (e.g., as part of establishing 515 the secure local connection), the RPS 101 also performs a liveness check to verify that the user in possession of the UMD 200 corresponds to the user's MIC provisioned on the UMD 200. In an embodiment, the RPS 101 includes a biometric sensor to capture biometric information of the user presenting at the RPS 101, such as a photograph, a video, a retina scan, a fingerprint, and the like. In another embodiment, the RPS 101 is configured to request a liveness check from the UMD 200. Due to the nature of the secure local connection as established through the handshake, the trustworthiness of information from the UMD 200 responsive to the request is preserved. Accordingly, in an embodiment, the UMD 200 collects and transfers information that the RPS 101 uses to perform the liveness check. For example, the UMD 200 collects a photograph and fingerprint, and accelerometer information that the RPS 101 uses to determine the user's hand motions or walking gait. In another embodiment, the RPS 101 determines that the UMD 200 is deemed trustworthy for performing its own liveness check, and such a UMD 200 liveness determination is accepted by the RPS 101. For example, the UMD 200 is a smartphone performing a facial recognition verification, whose valid result the RPS 101 accepts as verification that the user is legitimately in possession of the UMD 200 and presenting the UMD 200 at the RPS 101.

Following the establishment 515 of the secure local connection, the stopped vehicle automotive head unit or infotainment system, functioning as the RPS 101, configures 520 the stopped vehicle 100 to operate according to a mode. In embodiments, the RPS 101 communicates with the vehicle's automotive head unit to enable or disable some or all functionality of the stopped vehicle 100 according to modes. In an embodiment, the RPS 101 determines that the UMD 200 corresponds to an authorized student driver and directs the vehicle's automotive head unit to disable the radio, limit top speed, and otherwise place the vehicle into a student driver mode. Similar approaches enable the RPS 101 of the stopped vehicle 100 to require the UMD 200 to connect and identify driver privileges of the MIC 210 provisioned on the UMD 200. The RPS 101 then limits use of the stopped vehicle according to the corresponding driver privileges from the UMD 200. In such embodiments, the RPS 101 includes an RPS liveness check 120 to ensure that the vehicle occupant matches the MIC 210.

In another embodiment, the RPS 101 includes a permission mode, whereby the RPS 101 directs the vehicle's automotive head unit to enable or disable the vehicle based on which user MIC 210 is verified with the vehicle. For example, the RPS 101 is programmed to accept a MIC 210 from a list of drivers having permission to operate the vehicle. In another embodiment, the RPS 101 consults with an APS 300 of an insurance company and determines whether a MIC 210 pertains to an individual who is sufficiently covered or otherwise permitted to operate the vehicle. Accordingly, embodiments of the RPS 101 are configured to seek user or vehicle information regarding driver privileges from sources beyond the MIC 210, such as an APS 300 of the state DMV, and also check for dynamically changing privileges that are not necessarily indicated by the MIC 210 (e.g., when insurance records indicate the user is temporarily barred from driving while healing from an eye injury that prohibits safe driving). In alternate embodiments, the FRV 400 sends an override command or function to the RPS 101 of the stopped vehicle to configure the vehicle according to a mode, such as a safe slow-down mode or shut off mode, as part of the vehicle's refusal to stop. Such mode override commands or functions may be sent by the FRV 400 to the infotainment system of the stopped vehicle 100 in response to initiating a vehicle stop, remotely obtaining vehicle information, or remotely obtaining MIC user information. By way of example, an override command or function can be used if a first responder approaches a burning vehicle or one located in area of hazard to the first responder. Information providing the likelihood that the vehicle contains or contained a passenger would be invaluable information to the first responder, before the first responder approaches the vehicle hazard to determine if occupants of the vehicle need emergency services.

The FRV 400 then identifies that the FRV 400 is within connection range 525 of the RPS 101 of the stopped vehicle, e.g., when approaching an accident scene or by pulling over the stopped vehicle 100. The FRV 400 establishes 530 a vehicle connection (i.e., a vehicle-to-vehicle connection) with the stopped vehicle 100. The vehicle connection 530 may be established in the same manner as the secure local connection between the UMD 200 and RPS 101, but in an embodiment, between automotive infotainment systems or head units of the vehicles. The vehicle connection also may be based on transmission technology supporting relatively longer ranges. Communications between vehicles is achieved via direct communication systems or indirect communication systems. Example direct communication systems involve establishing a connection directly between vehicles, such as via cellular, Wi-Fi, Bluetooth, or CB radio. Example indirect communication systems are based on an external infrastructure including a network or server, whereby each vehicle establishes its own connection to the external infrastructure that facilitates communication between the vehicles or servers. Indirect communication systems include cellular phone networks and other systems that rely on the cellular phone network, satellite network, mesh network, or a server coordinating operation of a network. The wireless communications between vehicles allows for a safety buffer distance between the FRV 400 and the stopped vehicle 100. In embodiments, the vehicle connection is wireless and based on Wi-Fi, Bluetooth Class 1 or 2 devices, a cellular radio system, Citizens Band (CB) radio, and the like.

In an embodiment, the FRV 400 receives 532 vehicle information (visible), including a VIN, from the infotainment system of the stopped vehicle 100. This vehicle information 80 would be visibly apparent to an observer outside the stopped vehicle 100. Accordingly, the example system is configured to remotely obtain such information automatically, without needing release consent. In an embodiment, the infotainment system of the stopped vehicle 100 transmits the vehicle information 80, which can be visibly observed, to the FRV 400 automatically in response to establishing the vehicle connection 530. Other examples of vehicle information 80 that are observable include the license plate number, make of the stopped vehicle 100, model of the stopped vehicle 100, color of the stopped vehicle 100, and the like. Such information assists first responders by enabling the FRV to accurately pre-populate accident report information, citation information, and other such information, enabling first responders to avoid paperwork issues such as typographical errors, or mistaken vehicle descriptions (e.g., a night-time mistake of describing a dark blue vehicle color as black).

In an embodiment, the FRV 400 then sends 535 a vehicle information request to the infotainment system of the stopped vehicle 100. In another embodiment, the vehicle information request 535 is omitted and replace with an override command or function to remotely configure the RPS 101 of the stopped vehicle to automatically send vehicle information 80 (including that vehicle identification information, interior sensor information, or occupant status information which is not visible or apparent) to the FRV 400. In an embodiment, the vehicle information request 535 (or override command or function) from the FRV 400 informs the infotainment system of the stopped vehicle 100 of the nature of the situation, and requests only as much vehicle information or user information as needed to perform that given vehicle stop. Accordingly, other information about the vehicle or the vehicle occupant does not need to be released. In another embodiment, the vehicle information request 535 also includes a citation from the FRV 400, which the stopped vehicle's occupant may acknowledge or deny. The vehicle information request 535 also may include requests for vehicle information pertaining to the citation or interaction with the FRV 400.

The infotainment system of the stopped vehicle 100 then obtains selective user approval in response to receiving a vehicle information request 535 or requests for vehicle information. Such user approval is similar in nature to the selective user approval 555 described below but applied to release of vehicle information instead of user information. Upon user consent for release (or in response to an override command or function), the infotainment system of the stopped vehicle sends 540 the remaining (e.g., not visibly apparent) vehicle information to the FRV 400. This vehicle information 80 includes the registered owner status of the stopped vehicle 100, as well as internal sensor or camera information that describes occupant status (e.g., how many passengers are in the stopped vehicle 100) or other information. Such vehicle information assists the first responder in evaluating information or inconsistencies with the stopped vehicle 100. In an embodiment, the FRV 400 verifies the vehicle information by communicating with a back end, such as a DMV or first responder back end system.

In another embodiment, the FRV 400 requests release of vehicle information from a third-party system that interacts with the stopped vehicle 100. An embodiment of the system stores or provides pre-accident occupant status of the stopped vehicle 100, enabling first responders to know how many vehicle occupants to search for in accidents where occupants are ejected from the vehicle (e.g., where vehicle sensors previously reported, but no longer report those occupants). In a law enforcement vehicle stop, the occupant status enables LEO first responders to know whether persons might be hiding in the vehicle. In an embodiment, the vehicle information includes vehicle status information, such as operational vehicle status information or mechanical vehicle status information. Such vehicle information indicates the mechanical status of vehicle equipment or the operation or use of vehicle equipment such as turn signals, brakes, emissions, outstanding recalls, or other usage telemetry, operational telemetry, or maintenance telemetry, and the like. The vehicle occupant may selectively consent to sending such vehicle information, e.g., in response to a citation from the FRV 400.

The FRV 400 next sends FRV MIC user information request 545 to the infotainment system of the stopped vehicle 100, requesting MIC user information. Such a request can involve a request to furnish the vehicle occupant's identity or other MIC user information, such as driver privileges, medical records, and the like. As described above with respect to the vehicle information request, the MIC user information request can be selectively tailored to request only that information which is needed by the first responder for handling a given vehicle stop. Accordingly, the various requests each have a scope custom-tailored for a given vehicle stop (e.g., based on the type of information and the period of time relevant to a given citation), maximizing the privacy of the stopped vehicle 100 and vehicle occupants.

The RPS then forwards the FRV MIC user information request 545 as RPS MIC user information request 550 to the UMD 200. The UMD 200 prompts for selective user approval 555 to release MIC user information corresponding to the credential request. In the above embodiment, the credential request corresponds to a request by the first responder for enough user information to perform a given type of vehicle stop. Accordingly, the UMD 200 displays a prompt requesting the user's permission to release, from the UMD 200 to the RPS 101, MIC user information such as the user's photograph, name, age, and driving privileges as indicated in the MIC.

In another embodiment, the FRV 400 remotely obtains registered owner information of the stopped vehicle 100, e.g., based on performing a look-up at the DMV using visible vehicle information such as the license plate number or VIN of the stopped vehicle 100. The FRV 400 then contacts the registered owner, e.g., by sending a text message or otherwise establishing communications with the registered owner. The FRV 400 queries the registered owner as to whether the registered owner is an occupant of the stopped vehicle 100, and whether the registered owner would like to transfer their MIC user information, vehicle information, or other related documentation to the FRV 400.

In an online embodiment, upon granting consent at the UMD 200, the UMD 200 proceeds to provide 560 a token to the APS 300 and release 565 a token to the RPS 101, corresponding to allowing the APS 300 to release and provide delivery 570 of such MIC user information. In this online mode, the RPS 101 does not need to maintain a secure local connection with the UMD 200 during delivery 570 of the APS payload. In an embodiment, the delivery 570 of the APS payload is used for the transfer of relatively larger files. Accordingly, the user experience is improved by avoiding UMD battery drain and inconvenience associated with payload transfer directly from the UMD 200. Such payload transfers are handled online between the APS 300 and RPS 101, while still being selectively controlled by the user as to what specific user credential MIC information is released. In contrast to the online mode, in an offline mode the UMD 200 releases 565 such MIC user information directly from the UMD 200 to the RPS 101. Embodiments similarly allow for online or offline authorization to release vehicle information, or otherwise verify aspects of the transaction involving the stopped vehicle 100 and the FRV 400 (e.g., providing a citation, receiving acknowledgement of the citation, and securely transmitting vehicle information pertinent to the citation).

More specifically, in the online embodiment, the UMD 200 releases 565 an RPS token to the RPS and provide 560 a matching APS token to the APS 300. Such token deliveries comprise a relatively small digital footprint, enabling the deliveries to occur relatively quickly. The RPS 101 then transfers the RPS token to the APS 300, and the APS 300 verifies that the APS token from the UMD 200 matches the RPS token from the RPS 101. Upon token verification, the APS 300 releases, to the RPS 101, that MIC user information which the user has consented to release (e.g., consent as indicated in the tokens). The APS 300 digitally signs or encrypts the MIC user information being released, allowing for authentication 575 of the MIC user information by the RPS 101.

In the offline embodiment more specifically, upon receiving selective user approval 555, the UMD then releases 565 the requested MIC user information as a payload delivery to the RPS 101. The UMD 200 electronically signs or encrypts the MIC user information payload using a digital certificate from the APS 300 or public-key cryptography, to guarantee authenticity and integrity of the payload.

Upon receipt of the MIC user information (whether via online or offline mode), the RPS 101 confirms its authenticity 575 via the signature using a digital certificate from the APS 300, or decrypts the payload using the public key of the APS 300. In the online mode, the RPS 101 requests the public key or digital certificate from the APS 300 at the time of the transaction, which the RPS 101 then uses to prove the authenticity of the payload information. In the offline mode, the RPS 101 periodically refreshes stored digital certificates and public keys from the APS 300, such as monthly. In an embodiment, the RPS 101 stores the digital certificates or keys locally at the RPS 101. In another embodiment, the RPS 101 communicates with a trust list which caches public copies of public keys or certificates, separate from the APS 300. Accordingly, in the offline mode the RPS 101 can verify 575 MIC user information without needing to communicate with the APS 300 at the time of the transaction. Furthermore, the stored digital certificates or keys enable the RPS 101 to verify that the payload information from the MIC provisioned on the user's UMD 200 is trustworthy, without needing to independently obtain such payload information directly from the APS 300.

The MIC user information is sent 580 to the FRV 400. Such information, e.g., a photograph of the user, is staged at the FRV 400. Staging enables the FRV 400 to temporarily make use of the information in the context of the vehicle stop, without a need for the FRV 400 to independently retrieve such information from other sources, such as a first responder back end. In an embodiment, an LEO first responder directs the MDT of the FRV 400 to prepare a photo lineup including the user's photograph, to present to a witness riding in the FRV 400 with the LEO. In another embodiment, the LEO uses the MIC user information to prepopulate a citation or other documentation which the LEO needs to fill out. Using the vehicle information or the MIC user information to prepopulate citations or other documentation ensures that the user's or vehicle's information is not subject to error, whether by transcription or data entry errors or other variations, such as the LEO entering a different car make or model or color not precisely matching the actual vehicle information as stored on the stopped vehicle's RPS 101. Accordingly, the MIC environment enables improvements to the efficiency and accuracy of LEO duties.

Embodiments enable the FRV 400 or RPS 101 to provide customized guidance to assist the user in complying with the vehicle stop. In an embodiment, guidance is provided as part of providing the FRV MIC user information request 545 or the RPS MIC user information request 550. Such guidance is customized according to the type of vehicle stop. For example, the vehicle stop is a routine check for expired license plate stickers, and the guidance advises the vehicle occupant to determine whether replacement stickers or other proof of renewal are available to show to the first responder.

The MIC environments described herein can be used in public spaces or facilities based on government-issued MICs and corresponding MIC user information. Embodiments described herein can be used in other contexts. For example, a large commercial facility can make use of MIC environments, e.g., for individuals, vehicles, and security personnel assigned to the large commercial facility. Such large commercial facilities that can make use of the MIC environment include oil fields, technology campuses, amusement parks, academic campuses, and the like. Such facilities may issue their own MICs, or may provide information or privileges to be stored on existing (e.g., government-issued) MICs. In an embodiment, individuals authorized to patrol or secure the facilities (e.g., private LEOs or security guards) can perform vehicle stops on the large commercial facilities, and request and obtain MIC user information as described herein. Such embodiments are also applicable to any private venues that use security personnel and security vehicles. In an embodiment, a large gated community manages membership information and privileges using the MIC user environment. Security vehicles patrolling the gated community can perform vehicle-to-vehicle queries for vehicle information or MIC user information to, e.g., identify trespassers.

Figure 6:
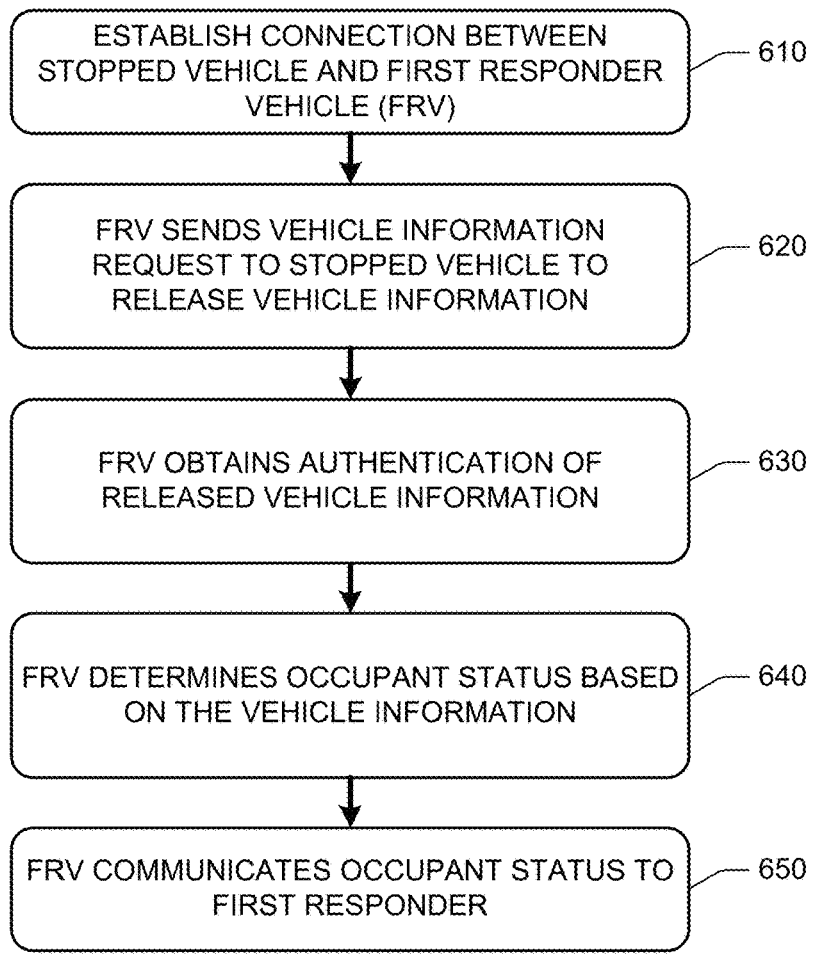
FIG. 6 illustrates a method of remotely obtaining passenger status according to an embodiment.

FIG. 6 illustrates a method 600 of remotely obtaining passenger status according to an embodiment. In block 610, the FRV establishes a connection with an infotainment system of a stopped vehicle. For example, when the first responder is a law enforcement officer, and performs a vehicle stop, a safety buffer distance is maintained between the FRV and the stopped vehicle. The FRV generates a directed beam signal, directed at the stopped vehicle. The infotainment system of the stopped vehicle is configured to respond to the directed beam signal and to perform a handshake and connection establishment suitable for the communication technology. In an embodiment, the communication technology is based on Wi-Fi to enable the connection between vehicles while still maintaining a safety buffer distance between vehicles. In another embodiment, the vehicle connection is indirect, e.g., each vehicle connects to a cellular network, and the cellular network maintains communications between vehicles. In embodiments, the automotive head unit or infotainment system of the stopped vehicle is configured to connect and interact with other vehicles.

In block 620, the FRV sends a vehicle information request message (generally, an information request message) to the infotainment system of the stopped vehicle requesting release of the vehicle information. For example, the FRV requests release of the vehicle's VIN and sensor information. In another embodiment, the request is omitted; the stopped vehicle is configured to automatically release the vehicle information in response to the infotainment system establishing a connection with the FRV. In an embodiment, to obtain consent for release of vehicle information, the infotainment system of the stopped vehicle displays a prompt to the vehicle occupant identifying which vehicle information is requested by the FRV. In another embodiment, the user is prompted, via a UMD connected to the infotainment system of the stopped vehicle, to independently and discretely approve each type of vehicle information request. Such consent for release of vehicle information enables a permissive release mode of the vehicle, whereby the vehicle by default is configured to obtain the user's permission before releasing vehicle information.

In block 630, the FRV obtains authentication of the vehicle information received in response to the vehicle information request. For example, the infotainment system of the stopped vehicle digitally signs vehicle information using an electronic certificate, prior to sending the vehicle information to the FRV. The FRV accesses an electronic certificate or decryption key to verify or decrypt the signed vehicle information.

In block 640, the FRV determines occupant status of the stopped vehicle, based on the vehicle information. For example, the FRV extracts seat sensor information (or interior sensor information or other occupant status information) from the vehicle information and infers which vehicle seats are occupied based on the extracted information. In another embodiment, the infotainment system of the stopped vehicle is configured to provide occupant status as part of the vehicle information (whether based on seat sensor information, interior sensors, occupant status information, or other technology particular to that stopped vehicle), and the FRV is configured to identify the occupant status portion of the vehicle information from the stopped vehicle. By way of explanation, modern vehicles include pressure sensors within vehicle seats to determine occupancy for airbag deployment. Such occupancy determination is relayed as an indicator of vehicle occupancy. The sensor information enables the infotainment system to identify a weight or lack of weight on the seat which is used to determine whether a person or object is in the seat. In vehicles that include interior motion sensors commonly used for notice of unauthorized entry, sensor data indicating movement in a location of the vehicle is used to indicate the likelihood of an occupant in that location of the vehicle.

In block 650, the FRV communicates the passenger status to the first responder. In an embodiment, the FRV includes an automotive head unit coupled to an MDT. The MDT is configured to provide visual prompts and other status information to the first responder operating the FRV. In an embodiment, upon stopping a vehicle and remotely obtaining passenger status, the MDT is configured to display the determined passenger status of the stopped vehicle, e.g., one front passenger and two backseat passengers.

Figure 7:
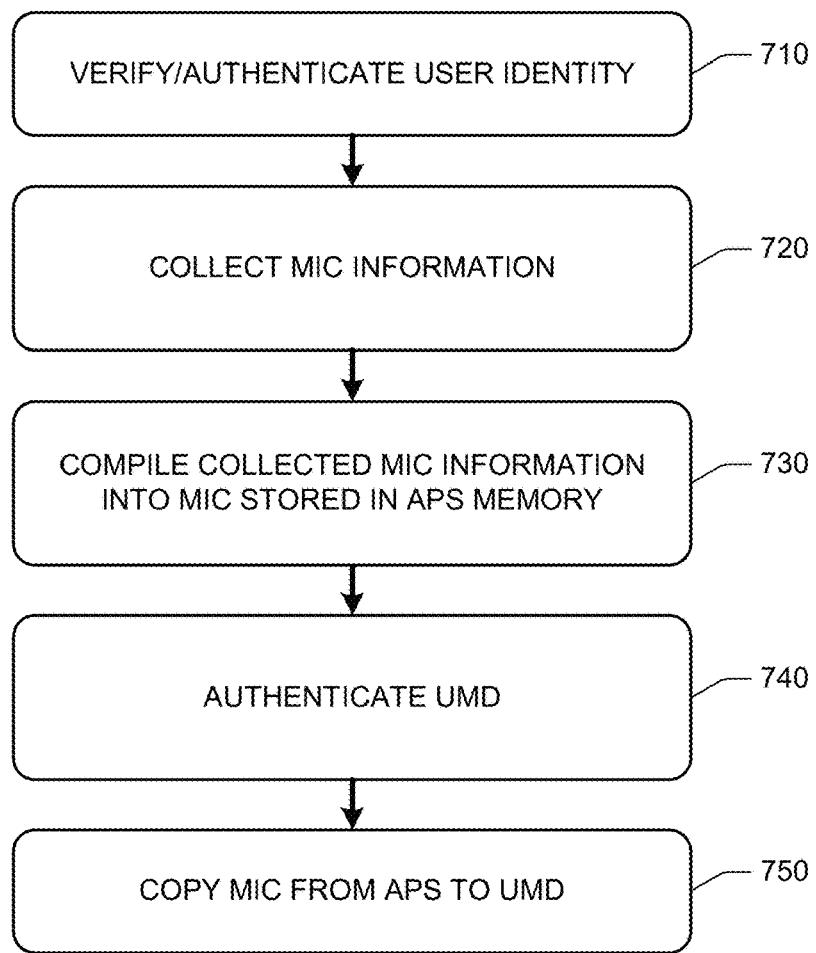
FIG. 7 illustrates a method of generating a MIC as performed by the APS according to an embodiment.

FIG. 7 illustrates a method 700 of generating a MIC as performed by the APS according to an embodiment. Such method is performed by the example MIC generator illustrated in FIG. 2. Generally, embodiments of the MIC generator handle creation or provisioning of the MIC, and support in-person and remote provisioning of the MIC onto the UMD.

In block 710, the MIC generator obtains proof of identity for the user whose MIC is to be generated. Such proof is provided via collected and verified information about the user, such as a birth certificate, social security card, proof of residency, or other identity-related documents for proving, authenticating, or otherwise verifying identity. In an embodiment, the APS is located at a DMV, and an agent of the DMV collects and manually verifies proof of identity that the user provides to the agent in person. In an embodiment, a kiosk at the DMV performs a liveness check of the user or otherwise performs unattended verification of the proof of identity that the user provides to the kiosk.

In another embodiment, the MIC generator facilitates verification of the user's identity attributes against official records available to the DMV or physically presented by the user. Facilitated verification can be attended by an agent in person, or unattended and self-performed by the user at a kiosk or other automated system. In an embodiment, such facilitated verification involves the use of a system such as a kiosk or electronic device with audio or video playback and recording, visual scanning, or other telepresence capabilities, which the user accesses to interact remotely with an agent from the DMV or other APS that is to provision the MIC. Such a system can be located remote from the DMV or other APS facility at which the agent is located and can be separate from the UMD. In an embodiment, the system to interact with the agent is the UMD that is to receive the MIC. Such system allows an agent at the DMV, through telepresence or other audio or visual interfaces of the system, to visually access, inspect, and verify information submitted as proof of identity (e.g., by scanning or photographing a birth certificate or the like). In another embodiment, such facilitated verification involves the user accessing a remote kiosk or smartphone app to virtually interact with an agent that facilitates the identity verification, or to interact with a self-guided verification user interface, such as a website or smartphone app.

Different types of MICs are associated with corresponding different levels of assurance (such as multi-factor authentication) needed to facilitate verification of the user's identity, whether in-person or remote, attended or unattended, or other aspects of the identity verification. Furthermore, in embodiments, a given MIC environment is associated with a corresponding trust framework, such as the healthcare field and a related set of rules pertinent to maintaining security of healthcare information. The level of assurance for a given MIC environment corresponds to the trust framework. Additionally, in an embodiment, communications with the MIC generator (and other aspects of the MIC environment including the APS, UMD, and RPS and their various modules or logic) are facilitated and secured by cryptographic modules, e.g., as outlined in the National Institute of Standards and Technology (NIST) requirements and standards for cryptographic modules, the Federal Information Processing Standard (FIPS) publication 201 regarding Personal Identity Verification (PIV) requirements, and the like.

In block 720, the MIC generator collects MIC information related to the MIC that is to be generated. For example, the MIC generator collects, from the APS, verified user biographic information such as name and address, and biometric information such as photograph and fingerprints, which will be part of the MIC. The APS provides such biometric information to the MIC generator as needed, e.g., by collecting the user's fingerprints or iris scan, taking the user's photograph, or the like. Additionally, the MIC generator collects from the APS other information, such as driving privileges, that relate to the MIC that is to be provisioned onto the UMD.

In block 730, the MIC generator compiles the collected MIC information into a MIC that is stored in the memory of the APS. In an embodiment, the MIC is one of multiple MICs comprising a database of MICs stored in the memory of the APS. In embodiments, the stored MIC is available for provisioning onto the UMD and is available to satisfy verification requests from RPS requesting MIC information from the APS according to an online mode.

In block 740, the MIC generator verifies the UMD on which the MIC will be provisioned. In an embodiment, the APS performs device identification and authentication by interfacing with the UMD to retrieve device-specific identity information from the UMD, such as the manufacturer and model of the user's UMD. In embodiments, such interfacing is carried out via secure wired or wireless local connections between the APS and the UMD. In another embodiment, the MIC generator of the APS interfaces with the UMD to identify and verify the UMD in a secure fashion facilitated by an electronically readable and cryptographically protected chip embedded in the UMD. In another embodiment, the APS performs a multi-factor authentication of the UMD to identify and verify the UMD. Authenticating or identifying the UMD enables the MIC generator to verify that the UMD is compatible with and approved for use with the MIC environment, including provisioning a MIC onto the UMD.

In block 750, the MIC generator copies the MIC from APS memory to the UMD. In an embodiment, the MIC is copied via the secure wired or wireless local connection between the APS and the UMD used to verify the UMD. In another embodiment, the MIC is remotely provisioned onto the UMD over a remote secure connection, such as via the internet. In embodiments, the local or remote connection, or transferred MIC, is digitally signed, via electronic certificates, to verify authenticity of the connections or transferred data. In another embodiment, encryption via public-key cryptography is used to ensure integrity of the connections or transferred data. In yet another embodiment, tokenization is used to safeguard the connections or transferred data. Other embodiments rely on combinations of multiple such data protection procedures, as well as other data security best practices. In an embodiment, the MIC generator reads the copied MIC from the UMD and compares the UMD copy of the MIC to the APS copy of the MIC to verify successful data transfer.

Figure 8:
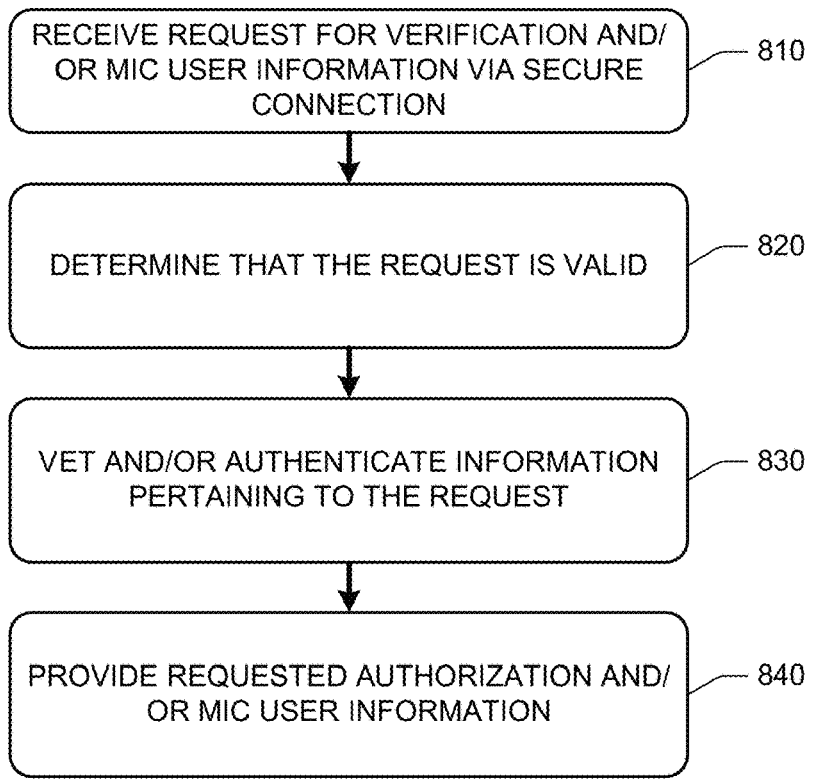
FIG. 8 illustrates a method of verification as performed by the APS according to an embodiment.

FIG. 8 illustrates a method 800 of verification as performed by the APS according to an embodiment. Such method is performed by the example verification system illustrated in FIG. 2. Generally, the APS verification system verifies various aspects relating to MIC information. For example, the APS verification system verifies whether a request to release user MIC information is legitimate, and if so, authorizes the release of such information. In an embodiment, the APS verification system authorizes release of MIC user information to the requesting RPS. In another embodiment, the APS verification system releases MIC user information to the UMD, e.g., when provisioning the MIC onto the UMD. In the illustrated embodiment, the verification system uses a verification application programming interface (API) to communicate with other systems requesting verification or MIC information, including RPSs or UMDs. In embodiments, the verification system of the APS is configured to communicate with other systems, such as other APSs including government entities, trusted certificate holders, open ID providers, back ends, and the like. The APS verification system enables such communications to be secure, ensuring the integrity of such communications.

In block 810, the verification system receives a request for verification or MIC user information via a secure connection. The APS establishes secure connections consistent with the various example secure connections as provided throughout the disclosure in the context of other embodiments presented herein. In an embodiment, the verification system establishes the secure connection in response to a request. In an embodiment, the verification system receives, via the secure connection and the verification API, a request from an RPS to release MIC user information to the RPS. In another embodiment, the verification system receives a request to verify MIC user information (e.g., as received by an RPS from a UMD according to an offline-mode transfer), without needing the APS to release MIC user information. In yet another embodiment, the verification system receives a request to authorize user identity information or documentation, MIC user information, or other aspects related to provisioning a MIC onto a UMD.

In block 820, the verification system determines that the request is valid. In an embodiment, the request is for the APS to verify a transaction, and the APS verifies the transaction by authenticating of one or more elements used to carry out the transaction. For example, the APS verifies that an APS certificate used in a transaction is authentic, or verifies information using public key cryptography. Such verification involves authentication of the connections, data transfers, or data itself. In another embodiment, the request is for the APS to release MIC user information, and the APS verifies the request based on the use of tokens. For example, the APS receives a UMD token from the UMD, and an RPS token accompanying the request from the RPS. The APS then compares the UMD token and the RPS token and confirms that both tokens are received within an acceptable timeframe to verify the request for the APS to release MIC user information.

In block 830, the verification system verifies the information pertaining to the request. In an embodiment, the verification system communicates with a first responder back end system to determine whether the requested information pertains to a user having a record or other information stored on the first responder back end system. In another embodiment, the verification system communicates with other servers, APSs (e.g., a governmental source such as a DMV), back ends, or other systems to cross-reference received information against other authoritative sources or copies of MIC user information locally stored at the APS. The verification system is also configured, in embodiments, to verify information before deeming the information trustworthy. For example, the APS uses cryptography to verify that information has not been tampered with, or uses an APS certificate to check authenticity of digitally signed information accompanying a request. Embodiments also perform similar checks on information stored at the APS, to verify its integrity.

In block 840, the verification system provides the requested authorization or MIC user information. In an embodiment, the verification system provides affirmative confirmation, e.g., a digitally signed token, that indicates that the requested authorization is granted. In another embodiment, the verification system provides affirmative confirmation, e.g., a digitally signed token, that the MIC user information pertaining to the request is authentic.

Figure 9:
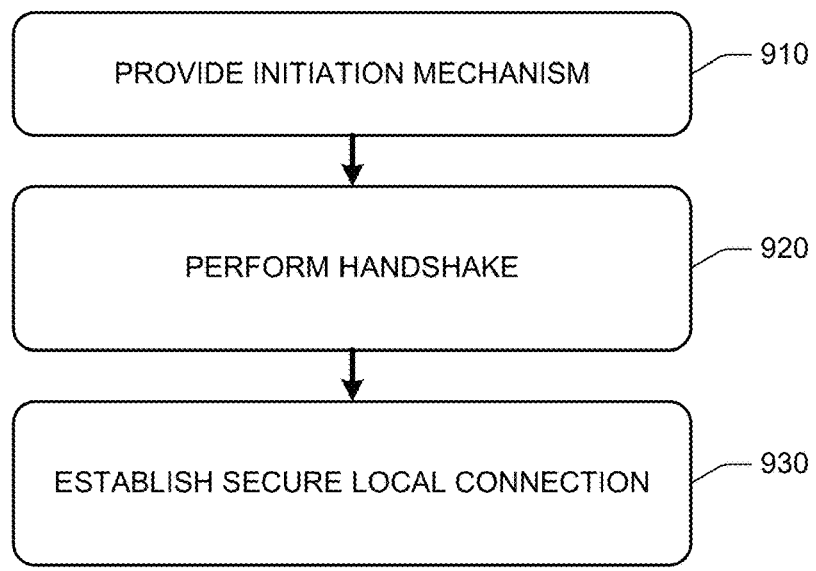
FIG. 9 illustrates a method of UMD engagement as performed by the RPS according to an embodiment.

FIG. 9 illustrates a method 900 of UMD engagement as performed by the RPS according to an embodiment. Such method is performed by the example UMD engagement logic illustrated in FIG. 3. Generally, the UMD engagement logic establishes a secure local connection between the RPS and the UMD, which is used for secure communications and data transfers between the RPS and the UMD.

In block 910, the RPS provides an initiation mechanism. The initiation mechanism provided by the RPS enables a UMD to initiate a connection with the RPS. In an embodiment, the RPS provides an optically readable QR code, and displays the QR code for scanning by a UMD. The UMD, in turn, optically reads (via UMD camera) and decodes the QR code to obtain information for performing a secure handshake with the RPS. In another embodiment, the UMD utilizes radio frequency protocols such as secure near-field, RFID, Bluetooth, Wi-Fi, or the like. For example, a user places the UMD on an RFID reader of the RPS, which detects the UMD presence as proximal consent to allow the RPS to perform the secure handshake with the UMD.

In block 920, the RPS and UMD perform a handshake. In an embodiment, the handshake is performed in response to the initiation of the transaction described above with respect to block 910. The secure handshake is performed, e.g., via a cryptographic key exchange such as a Diffie-Hellman key exchange and enables the RPS to establish the secure connection with the UMD.

In block 930, the RPS and UMD establish a secure local connection. The secure local connection enables the RPS and UMD to exchange information securely. The secure local connection enables exchange of requests or responses, tokens, and MIC information.

In an embodiment, the secure local connection is established via, or based on Bluetooth Low Energy (BLE). The RPS and UMD establish their modes, whether BLE central mode (scanning) or BLE peripheral mode (advertising), and exchange connection information such as transmitter signal strength, media access control (MAC) addresses, universally unique identifiers (UUIDs), device names, and the like. Such information, corresponding to BLE, enables the RPS and UMD to establish the local secure connection. In embodiments, the BLE connection provides BLE-specific security measures. In other embodiments, the RPS and UMD apply security at the application layer of the secure local connection, e.g., via cryptography implemented at the RPS and UMD. The secure local connection is established, and data transfers can begin by the RPS or UMD setting a connection state to 'start.'

In another embodiment, the communication is based on near-field communication.

Figure 10:
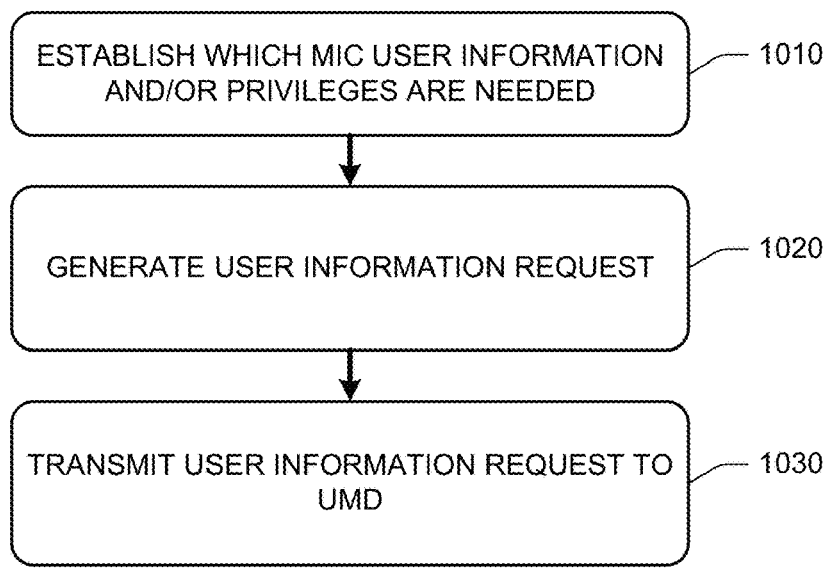
FIG. 10 illustrates a method of UMD information request as performed by the RPS according to an embodiment.

FIG. 10 illustrates a method 1000 of UMD information request as performed by the RPS according to an embodiment. Such method is performed by the example UMD information request logic illustrated in FIG. 3. Generally, the RPS needs information from the UMD, which the RPS uses for interacting with the vehicle or as needed by a first responder in a given vehicle stop. In an embodiment, the RPS serving as an automotive head unit needs identity information from the user's UMD, in order to verify the identity of the user, and to verify the user's vehicle operating status or privileges (e.g., including whether to configure the vehicle according to a particular mode corresponding to the user).

In block 1010, the RPS establishes which MIC user information or privileges the RPS needs from the UMD. In the automotive head unit or infotainment system RPS embodiment, the RPS may be requested by a first responder to provide the user's photograph, name, date of birth, and driving privileges, based on the RPS establishing that the needed information is commensurate with a given vehicle stop. Such requested information is 1) used by the RPS to check the status of the vehicle occupants, and 2) used by the RPS to pass the MIC user information (along with the vehicle information) to the FRV or first responder (e.g., via the MDT of the FRV). In other embodiments, the RPS determines that additional MIC user information is needed for the purpose of configuring the vehicle according to a given mode, such as whether the driver vehicle occupant is associated with restricted driving privileges (whether during certain times of the day, or other restrictions).

In block 1020, the RPS generates the user information request. In an embodiment, the RPS constructs the request as a data structure, such as a token or file, that is stored in the memory of the RPS. The RPS constructs the user information request in a manner that the UMD can act on, e.g., to identify which specific aspects of the MIC user information (or other information such as privileges) are needed by the RPS. The user information request is also structured to enable the UMD to selectively consent to release of one or more of the compartmentalized portions of the user information request. For example, the UMD approves release of a name request contained in the user information request, while not approving release of a social security request contained in the user information request.

In block 1030, the RPS transmits the user information request to the UMD. In an embodiment, the RPS and UMD exchange such information via the secure local connection established as set forth above.

Figure 11:
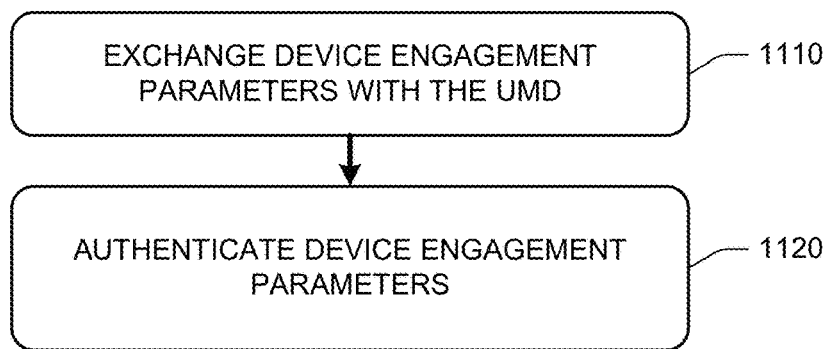
FIG. 11 illustrates a method of UMD verification as performed by the RPS according to an embodiment.

FIG. 11 illustrates a method 1100 of UMD verification as performed by the RPS according to an embodiment. Such method is performed by the example UMD verification logic illustrated in FIG. 3. Generally, the RPS verifies that it is communicating with a legitimate UMD, as part of ensuring that information to or from the UMD is trustworthy.

In block 1110, the RPS exchanges device engagement parameters with the UMD. Such exchange is like the exchanges as set forth above with respect to FIG. 9 regarding establishing the secure local connection. Furthermore, in embodiments, the exchange involves parameters that enable the RPS to verify that the UMD is part of an acceptable MIC environment, such as the UMD being verified to store a provisioned MIC on the UMD. For example, the RPS requests a token or digitally signed information from the UMD that indicates authenticity as trusted by the APS with which the RPS conducts transactions.

In block 1120, the RPS verifies the device engagement parameters. For example, the RPS confirms that the token or information received from the UMD is authorized by the APS, e.g., by examining the digital signature of the token or information, or by decrypting the token or information using a public key of the APS. In an embodiment, the RPS uses electronic certificates to verify authenticity of the connections or transferred data from the UMD. In another embodiment, the RPS uses encryption via public-key cryptography to ensure integrity of the connections or transferred data from the UMD. In yet another embodiment, the RPS uses tokenization to safeguard the connections or transferred data from the UMD. Other embodiments rely on combinations of multiple such data protection procedures, as well as other data security best practices, to perform UMD verification.

Figure 12:
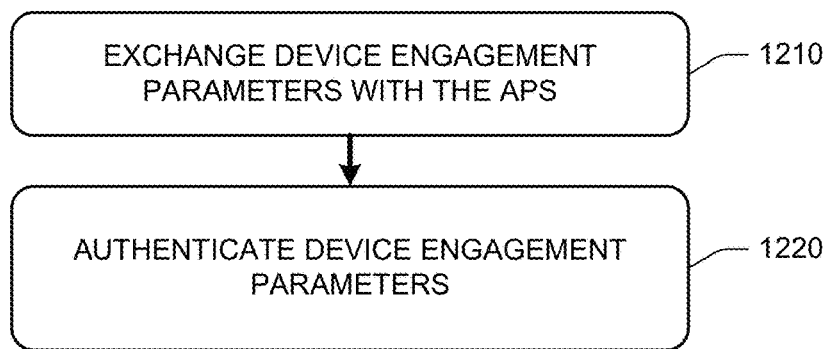
FIG. 12 illustrates a method of APS verification as performed by the RPS according to an embodiment.

FIG. 12 illustrates a method 1200 of APS verification as performed by the RPS according to an embodiment. Such method is performed by the example APS verification logic illustrated in FIG. 3. Generally, the RPS verifies that it is communicating with a legitimate APS, as part of ensuring that information to or from the APS is trustworthy.

In block 1210, the RPS exchanges device engagement parameters with the APS. Such exchange is like the exchanges as set forth above with respect to FIG. 9 regarding establishing the secure local connection. Furthermore, in embodiments, the exchange involves parameters that enable the RPS to verify that the APS is part of an acceptable MIC environment, such as the APS being verified to authenticate information received from a UMD. For example, the RPS requests a token or digitally signed information from the APS that indicates authenticity as trusted by a certificate repository with which the RPS accesses independent of the APS. In another embodiment, the RPS keeps a local copy of a public key known to be held by trustworthy APSs. The RPS requests from the APS information encrypted by a private key of the APS.

In block 1220, the RPS verifies the device engagement parameters. For example, the RPS confirms that the token or information received from the APS matches publicly available or trustworthy APS certificates, e.g., by examining the digital signature of the token or information, or by decrypting the token or information using a trusted public key of the APS (whether locally stored, or available from a trusted certificate repository). In an embodiment, the RPS uses electronic certificates to verify authenticity of the connections or transferred data from the APS. In another embodiment, the RPS uses encryption via public-key cryptography to ensure integrity of the connections or transferred data from the APS. In yet another embodiment, the RPS uses tokenization to safeguard the connections or transferred data from the APS. Other embodiments rely on combinations of multiple such data protection procedures, as well as other data security best practices, to perform APS verification.

Figure 13:
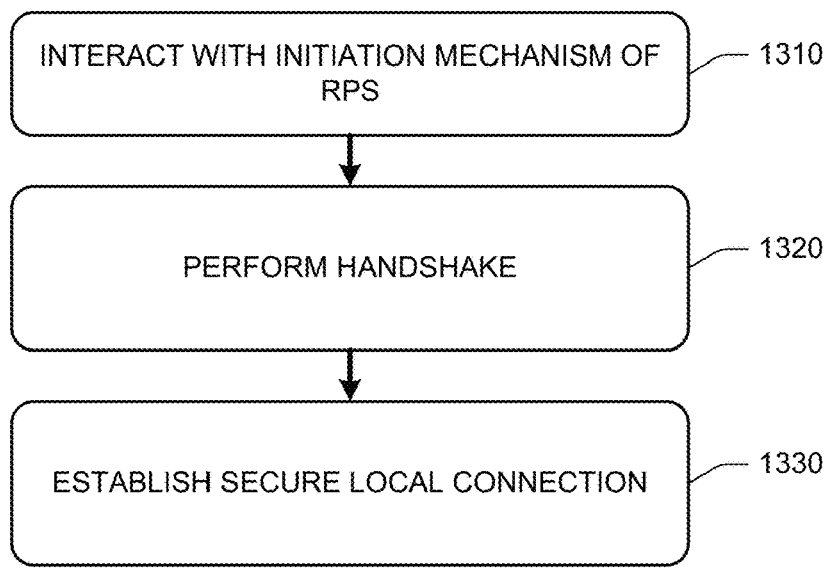
FIG. 13 illustrates a method of RPS engagement as performed by the UMD according to an embodiment.

FIG. 13 illustrates a method of RPS engagement as performed by the UMD according to an embodiment. Such method is performed by the example RPS engagement logic illustrated in FIG. 4. Generally, the RPS engagement logic corresponds to the UMD engagement logic as set forth above with respect to FIG. 9, but from the perspective of the UMD instead of the RPS. The RPS engagement logic generally establishes a secure local connection between the UMD and the RPS, which is used for secure communications and data transfers between the UMD and the RPS.

In block 1310, the UMD interacts with an initiation mechanism of the RPS. The initiation mechanism provided by the RPS enables the UMD to initiate a connection with the RPS. In an embodiment, the reads an optically readable QR code from the RPS. The UMD extracts from the QR code the information for performing a secure handshake with the RPS. In another embodiment, the UMD utilizes radio frequency protocols such as secure near-field, RFID, Bluetooth, Wi-Fi, or the like to interact with the RPS. For example, a user places the UMD on an RFID reader of the RPS, which detects the UMD presence as proximal consent to allow the RPS to perform the secure handshake with the UMD.

In block 1320, the UMD and RPS perform a handshake. In an embodiment, the handshake is performed in response to the initiation of the transaction described above with respect to block 1310. The secure handshake is performed, e.g., via a cryptographic key exchange such as a Diffie-Hellman key exchange and enables the UMD to establish the secure connection with the RPS.

In block 1330, the UMD and RPS establish a secure local connection. The secure local connection enables the UMD and RPS to exchange information securely. The secure local connection enables exchange of requests or responses, tokens, and MIC information. In an embodiment, the secure local connection is established via Bluetooth Low Energy (BLE). The UMD and RPS establish their modes, whether BLE central mode (scanning) or BLE peripheral mode (advertising), and exchange connection information such as transmitter signal strength, media access control (MAC) addresses, universally unique identifiers (UUIDs), device names, and the like. Such information, corresponding to BLE, enables the UMD and RPS to establish the secure local connection. In embodiments, the BLE connection provides BLE-specific security measures. In other embodiments, the UMD and RPS apply security at the application layer of the secure local connection, e.g., via cryptography implemented at the UMD and RPS. The secure local connection is established, and data transfers begin by the UMD or RPS setting a connection state to 'start.'

Figure 14:
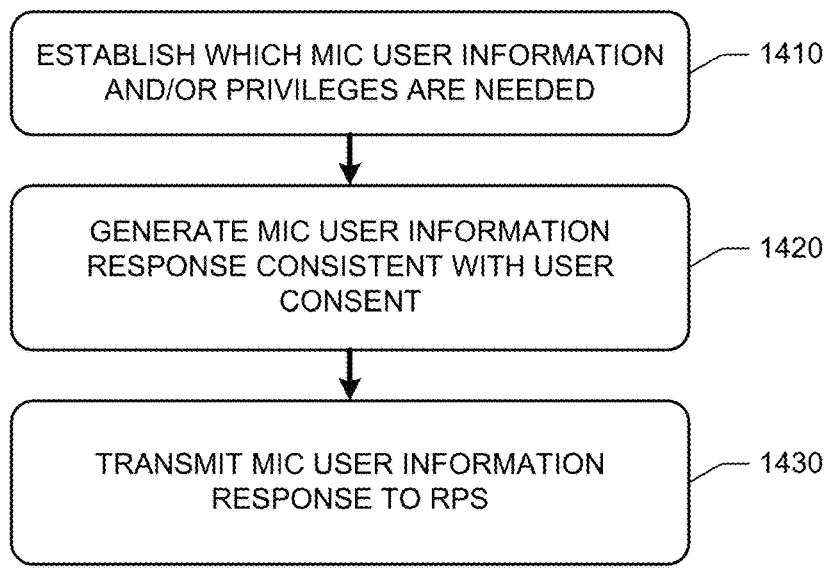
FIG. 14 illustrates a method of RPS information access as performed by the UMD according to an embodiment.

FIG. 14 illustrates a method of RPS information access as performed by the UMD according to an embodiment. Such method is performed by the example RPS information access logic illustrated in FIG. 4. Generally, the RPS information access logic is responsive to the UMD information request logic as set forth above with respect to FIG. 10, but from the perspective of the UMD instead of the RPS. The UMD (e.g., in an offline mode) needs to provide MIC user information to the RPS (offline mode) or needs to provide a token granting the RPS access to such MIC user information online at an APS (online mode). The RPS needs such MIC user information for a given interaction between the UMD and the RPS. In an embodiment, the RPS serving as an automotive head unit needs identity MIC user information (from the user's UMD in offline mode, or from the APS in online mode), in order to verify the identity of the user, and to verify the user's driving privileges.

In block 1410, the UMD establishes which MIC user information or privileges the RPS needs from the UMD. In an automotive head unit RPS embodiment, the UMD examines an information request from the RPS, to establish that the RPS needs the user's photograph, name, date of birth, and driving privileges. Such requested information is 1) used by the RPS to check the status of the vehicle occupants, and 2) used by the RPS to pass the MIC user information (along with the vehicle information) to the FRV or first responder (e.g., via the MDT of the FRV). In other embodiments, the RPS determines that additional MIC user information is needed for the purpose of configuring the vehicle according to a given mode, such as whether the driver is associated with restricted driving privileges (whether during certain times of the day, or other restrictions).

In block 1420, the UMD generates the MIC user information response, which is potentially responsive to the user information request from the RPS (depending on user consent). In an embodiment, the UMD constructs the response as a data structure, such as a token or file, that is stored in the memory of the UMD. The UMD constructs the MIC user information response in a manner that the RPS can act on, e.g., indicating which specific aspects of the user information request are being fulfilled by the UMD, in accordance with the consent granted by the user. The MIC user information response is also structured in accordance with the selective consent of the user to release one or more of the compartmentalized portions of the MIC user information or other information such as MIC privileges. For example, the UMD includes a name in the MIC user information response, while not including a social security in the MIC user information response. In an offline embodiment, the MIC user information response sent to the RPS includes the actual data (protected according to data protection best practices) that the user consents to release, as sourced from the MIC stored locally on the UMD. In an online embodiment, the MIC user information response sent to the RPS is a token that indicates, to an APS, which MIC user data, as stored on the APS, the user consents to release from the APS to the RPS.

In block 1430, the UMD transmits the user information response to the RPS. In an embodiment, the UMD and RPS exchange such information via the secure local connection established as set forth above. In an offline embodiment, the UMD transmits to the RPS the actual MIC user data. In an online embodiment, the UMD transmits to the RPS a token indicating which MIC user data the user consents to be released from the APS to the RPS. The RPS exchanges such a token at the APS to receive the actual MIC user data, conditioned on the APS matching the RPS token with a similar token received directly from the UMD.

Figure 15:
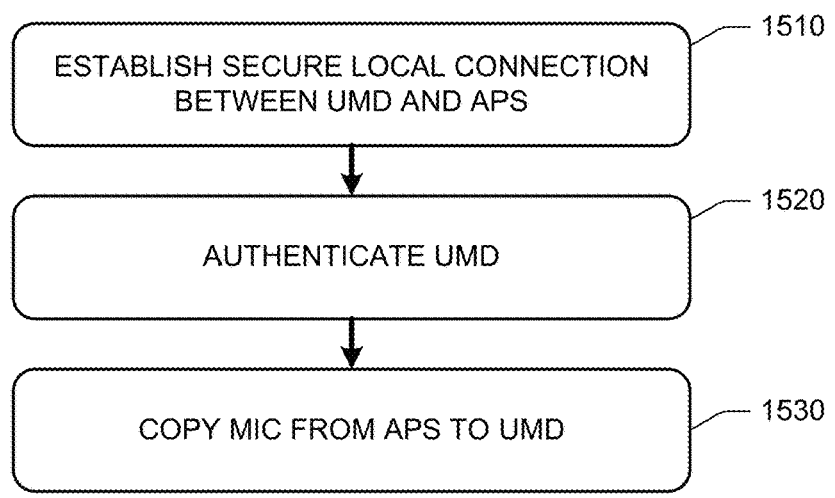
FIG. 15 illustrates a method of APS provisioning as performed by the UMD according to an embodiment.

FIG. 15 illustrates a method of APS provisioning as performed by the UMD according to an embodiment. Such method is performed by the example APS provisioning logic illustrated in FIG. 4. Generally, the APS provisioning logic is responsive to the MIC generator as set forth above with respect to FIG. 7, but from the perspective of the UMD instead of the APS. Embodiments of the APS provisioning logic handle receiving or provisioning of the MIC from the APS onto the UMD, and support in-person and remote provisioning of the MIC onto the UMD.

In block 1510, APS provisioning logic directs the UMD to establish a secure local connection with the APS. For example, the UMD interfaces with an RFID scanner provided by the APS and configured to obtain proximal consent from the UMD to exchange connection information and initiate a secure local connection between the UMD and APS, responsive to the user bringing the UMD within sensing proximity to the RFID scanner of the APS.

In block 1520, the APS provisioning logic directs the UMD to verify with the APS that is to provision the MIC onto the UMD. In an embodiment, the APS provisioning logic of the UMD responds to the APS performing device identification and authentication. For example, the APS interfaces with the UMD to retrieve device-specific identity information from the UMD, such as the manufacturer and model of the user's UMD. In embodiments, such interfacing is carried out via secure wired or wireless local connections between the UMD and the APS. In another embodiment, the APS provisioning logic of the UMD interfaces with the APS via a secure fashion facilitated by an electronically readable and cryptographically protected chip embedded in the UMD. In another embodiment, the APS provisioning logic of the UMD is responsive to the APS performing a multi-factor authentication of the UMD to enable the APS to identify and verify the UMD. Authenticating or identifying the UMD enables the APS provisioning logic of the UMD to verify to the APS that the UMD is compatible with and approved for use with the MIC environment, including provisioning a MIC onto the UMD.

In block 1530, the APS provisioning logic directs the UMD to receive a copy of the MIC, copied by the APS from APS memory to secure or encrypted local memory of the UMD. In an embodiment, the MIC is copied via the secure wired or wireless local connection between the UMD and the APS as set forth above. In another embodiment, the UMD receives a remotely provisioned MIC via a remote secure connection, such as via the internet. In embodiments, the local or remote connection, or the transferred MIC user information, is digitally signed, via electronic certificates, to verify authenticity of the connections or transferred data to enable an RPS to verify offline mode transfers of the MIC from the UMD to the RPS. In another embodiment, encryption via public-key cryptography is used to ensure integrity of the connections or transferred MIC user data. In yet another embodiment, tokenization is used to safeguard the connections or transferred data. Other embodiments rely on combinations of multiple such data protection procedures, as well as other data security best practices. In an embodiment, the MIC generator reads the copied MIC from the UMD and compares the UMD copy of the MIC to the APS copy of the MIC to verify successful data transfer.

Figure 16:
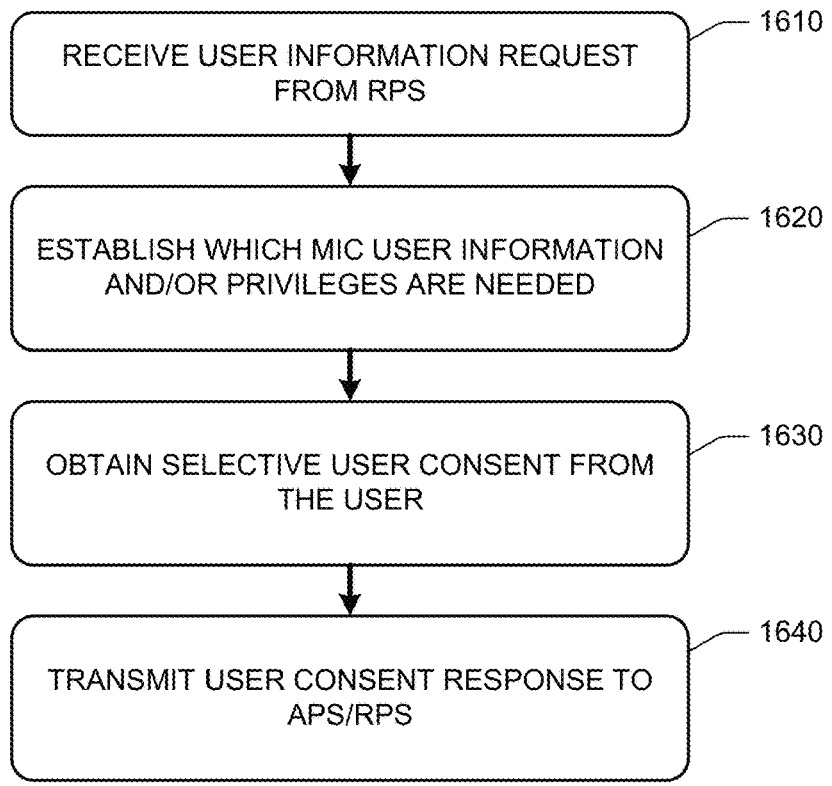
FIG. 16 illustrates a method of APS or RPS consent as performed by the UMD according to an embodiment.

FIG. 16 illustrates a method of APS or RPS consent as performed by the UMD according to an embodiment. Such method is performed by the example APS or RPS consent logic illustrated in FIG. 4. Generally, the APS or RPS consent logic corresponds to the UMD information request logic as set forth above with respect to FIG. 10, but from the perspective of the UMD instead of the RPS. The APS or RPS consent logic generally enables the user in possession of the UMD to selectively consent to release of MIC user information, whether requested directly from the UMD (offline mode), or whether granting access to the MIC user information as stored on and retrieved directly from the APS (online mode).

In block 1610, the UMD receives a user information request from the RPS. In an embodiment, the UMD receives the user information request from the RPS via the secure local connection established between the RPS and UMD as set forth above.

In block 1620, the UMD establishes which MIC user information or privileges the RPS needs from the UMD. In an embodiment, the APS or RPS consent logic digests the received user information request from the RPS to extract the fields corresponding to compartmentalized MIC information to which the user needs to selectively grant or withhold consent for release. In an automotive head unit RPS embodiment, the RPS user information request indicates a need for the user's photograph, name, date of birth, and driving privileges. Such requested information is 1) used by the RPS to check the status of the vehicle occupants, and 2) used by the RPS to pass the MIC user information (along with the vehicle information) to the FRV or first responder (e.g., via the MDT of the FRV). In other embodiments, the RPS determines that additional MIC user information is needed for the purpose of configuring the vehicle according to a given mode, such as whether the vehicle occupant is associated with restricted driving privileges (whether during certain times of the day, or other restrictions).

In block 1630, the APS or RPS consent logic directs the UMD to obtain selective user consent from the user. In embodiments, the APS or RPS consent logic is also referred to as a privacy dialog. In an embodiment, the UMD is a mobile device that has user interface logic that enables a user interface controller to provide a user interface. The APS or RPS consent logic directs the smartphone user interface to display a prompt that identifies the user information request and prompts for consent to each portion of the user information request. For example, the APS or RPS consent logic directs the user interface to prompt "Consent to release date of birth to first responder Yes or No?" The APS or RPS consent logic receives the user's response and continues to prompt for the remainder of additional needed MIC user information (or vehicle information). Accordingly, the APS or RPS consent logic collects the various selective responses to the various corresponding prompts for different aspects of consent, and packages such responses into a user consent response. In an embodiment, the user consent response serves as a user consent token, which the RPS passes to the APS to retrieve corresponding MIC user information (e.g., in an online mode). In another embodiment, the APS or RPS consent logic combines multiple requests into a single prompt, for example, where the multiple different types of consent are needed, and if less than all types are received, the transaction fails due to insufficient user consent. In the automotive head unit embodiment, the APS or RPS consent logic displays a single prompt asking the user to consent to release all specified MIC user information that is required by a given vehicle stop in order to allow the user to comply with first responder instructions particular to that vehicle stop. For example, the APS or RPS consent logic directs the UMD to display "Consent to release photograph, name, date of birth, and driving privileges to first responder Yes or No?" In other embodiments, the RPS specifies which types of consent prompts are combined. In an embodiment, the UMD displays such combination prompts, while allowing the user to maintain selective consent responses.

In block 1640, the APS or RPS consent logic directs the UMD to transmit the user consent response to the APS or RPS. In an embodiment, such information is transmitted via secure connections established as set forth above. For example, the user consent response is packaged as a token indicating which specific consent is granted by the user, and the token is sent to 1) the RPS, and 2) the APS. The RPS forwards the RPS token to the APS, and the APS compares the RPS token to the UMD token that the APS received directly from the UMD. Upon matching, the APS verifies that the consent indicated in the token is trustworthy.

Figure 17:
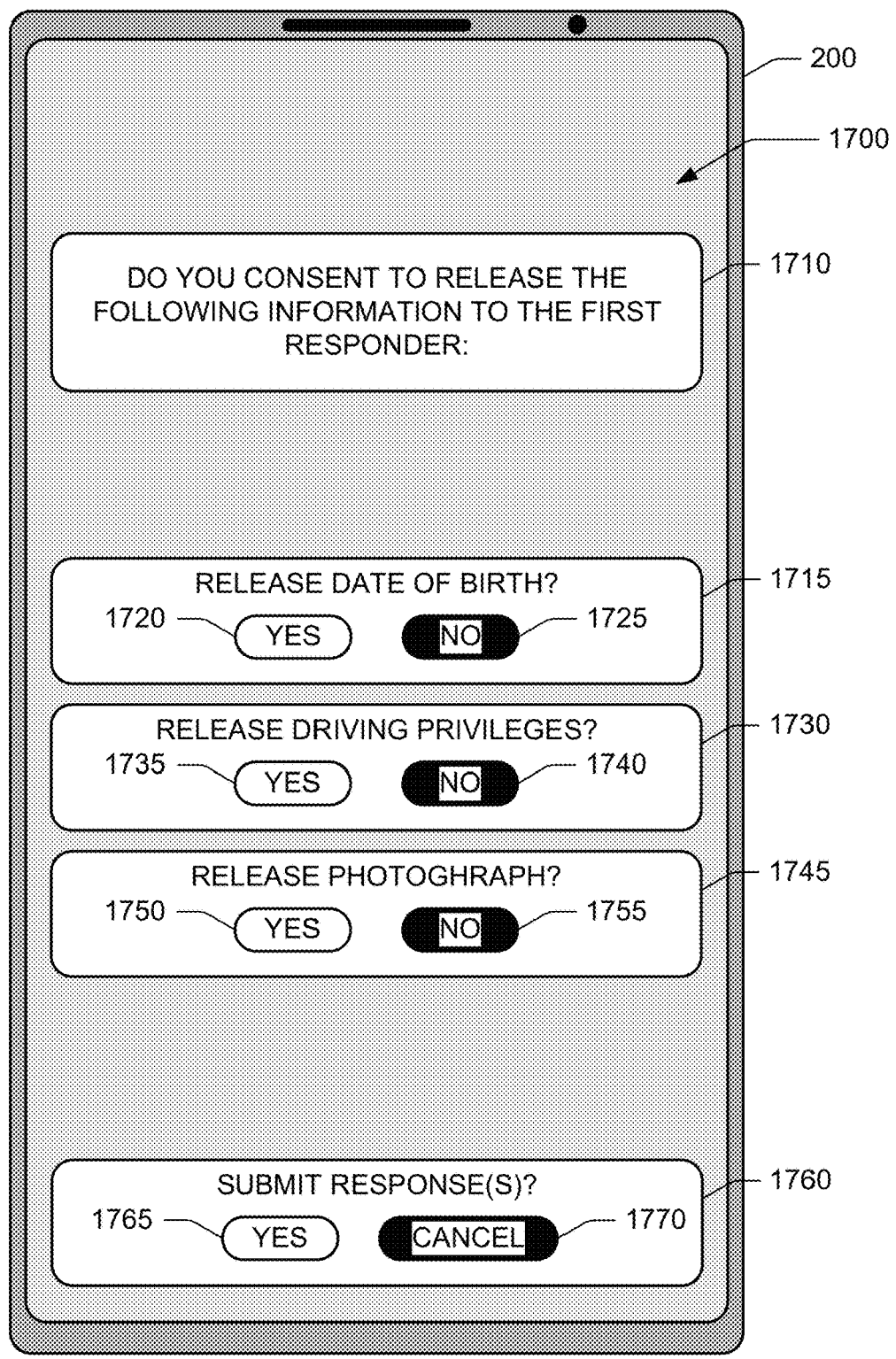
FIG. 17 illustrates a privacy dialog according to an embodiment.

FIG. 17 illustrates a privacy dialog 1700 according to an embodiment. The privacy dialog 1700 enables interaction between a user and the UMD 200, enabling the user to grant selective consent to release of MIC user information. In embodiments, the UMD 200 provides the privacy dialog 1700 via APS or RPS consent logic running on the UMD 200.

The privacy dialog 1700 includes an information prompt 1710, individual release prompts 1715, 1730, 1745, and a submit prompt 1760. The various prompts enable the user to easily view which specific MIC information is requested by the RPS, and selectively grant consent to those prompts to which the user agrees, while selectively denying consent to those prompts to which the user disagrees. The release prompts include YES or NO radio buttons, which are illustrated in a default selection of NO to encourage a security-centric option that protects the user's MIC information from release by default. If the user agrees to release a given piece of MIC user information, the user selects the YES button in the release prompt corresponding to that MIC information.

The multiple different prompts provide a readily appreciated interface for the user to easily understand exactly which types of MIC user information the RPS is requesting be released by the UMD 200. Furthermore, the ability to selectively provide or withhold consent to different types of requests provides the user with control and privacy because only the user-selected portion of the user's MIC information will be released.

When the various YES or NO radio buttons are configured to the user's satisfaction, the user interacts with the submit prompt 1760 to indicate that the user is ready to release the indicated selective MIC information. As illustrated, the user presses a YES button 1765 to submit the user's selective consent as indicated in the individual release prompts 1715,

1730, 1745. As set forth above, the UMD 200 then releases the user consent response (e.g., as a token) or the actual MIC user information stored on the UMD 200 (e.g., in an offline embodiment). If the user does not agree to submit responses, the user presses the cancel button 1770.

Figure 18:
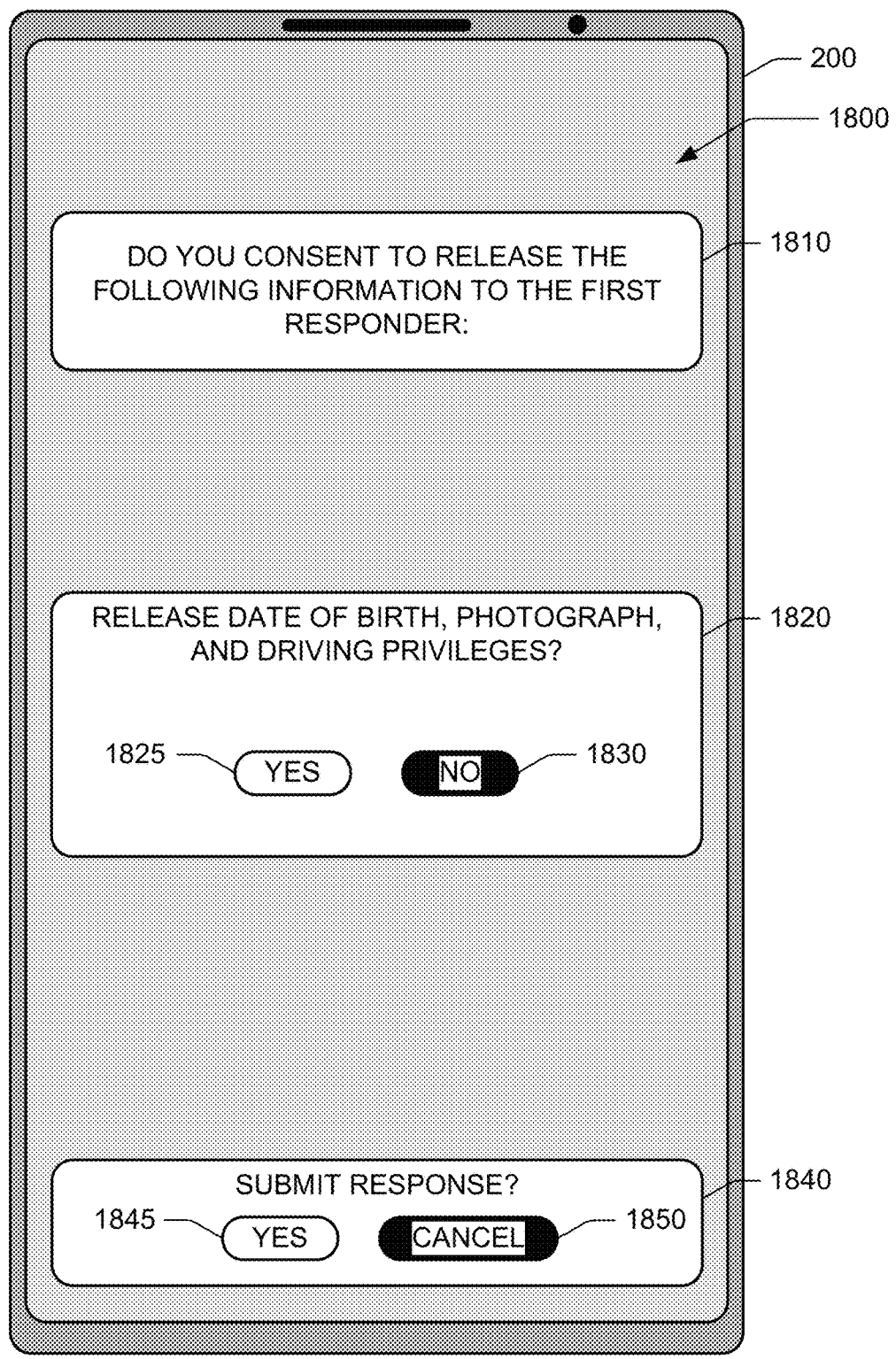
FIG. 18 illustrates a privacy dialog according to an embodiment.

FIG. 18 illustrates a privacy dialog 1800 according to an embodiment. The privacy dialog 1800 enables interaction between a user and the UMD 200, enabling the user to grant selective consent to release MIC user information. In embodiments, the UMD 200 provides the privacy dialog 1800 via APS or RPS consent logic running on the UMD 200.

The privacy dialog 1800 includes an information prompt 1810, a combination release prompt 1820, and a submit prompt 1840. The combination release prompt 1820 enables the user to easily view which specific MIC information is requested by the RPS. Furthermore, in the illustrated embodiment, the combination release prompt 1820 serves as an indication to the user that this request must be answered in full or not answered. Here, the RPS is an automotive head unit that informs the user that, for the vehicle stop, all three types of MIC user information are requested by the first responder. Accordingly, the combination release prompt 1820 seeks consent to release all three types of MIC user information. Such presentation saves time for the user by needing only a single consent selection, while also communicating the nature of the RPS request being of an "all or nothing" type. The combination release prompt 1820 includes a YES or NO radio button, which is illustrated in a default selection of NO to encourage a security-centric option that protects the user's MIC information from release by default. If the user agrees to release the combination of MIC information, the user selects the YES button 1825 in the combination release prompt 1820.

The user interacts with the submit prompt 1840 to indicate that the user is ready to release MIC user information. As illustrated, the user presses a YES button 1845 to submit the user's combination consent as indicated in the combination release prompt 1820. If the user does not agree to submit, the user presses the cancel button 1850.

Figure 19:
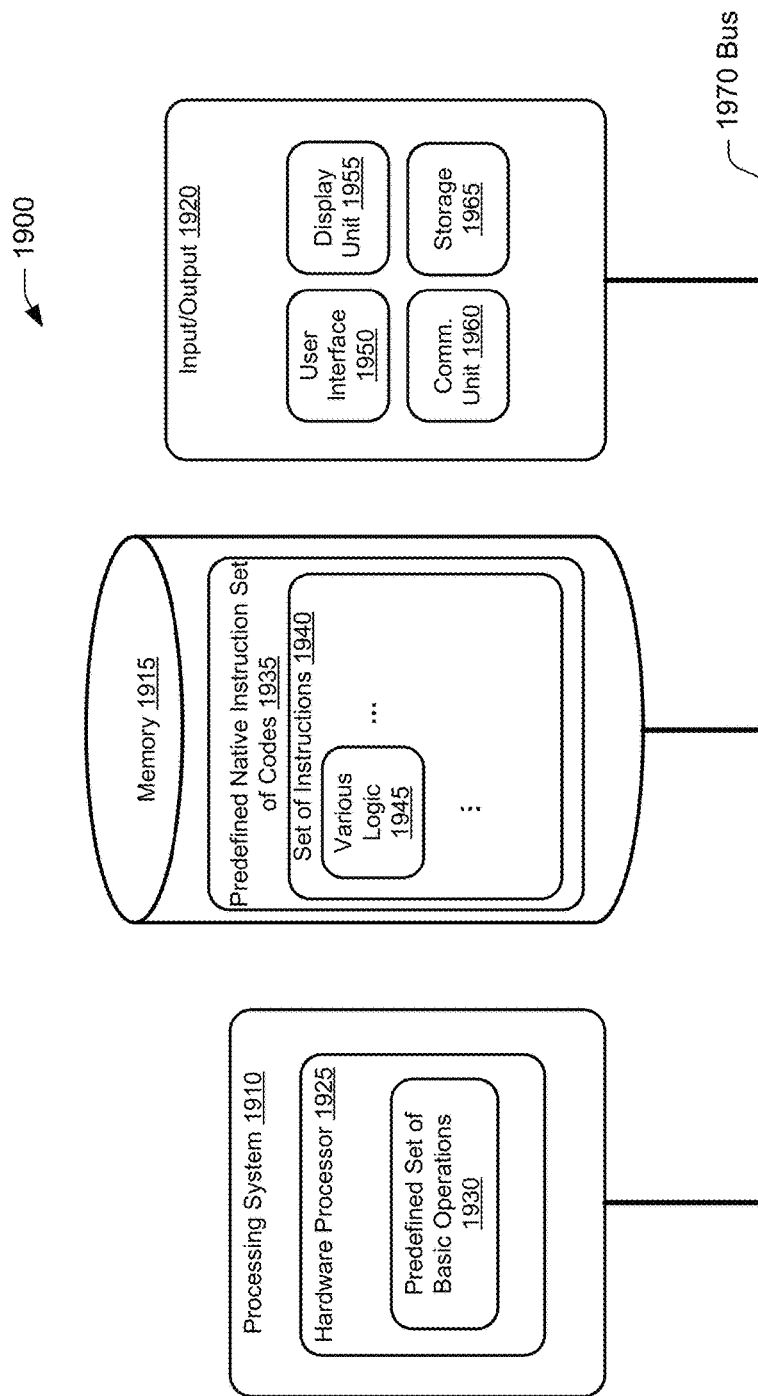
FIG. 19 illustrates a computing system including logic according to an embodiment.

FIG. 19 illustrates an apparatus or a computer system 1900 including logic according to an embodiment. The computer system 1900 includes a processing system 1910 having a hardware processor 1925 configured to perform a predefined set of basic operations 1930 by loading corresponding ones of a predefined native instruction set of codes 1935 as stored in the memory 1915.

Here, the term computer system includes a processing system such as processing system 1910 and a memory such as memory 1915 accessible to the processing system.

The processing system includes at least one hardware processor, and in other embodiments includes multiple processors or multiple processor cores. In one embodiment, a computer system is a standalone device. The processing system in yet another embodiment includes processors from different devices working together. In embodiments, a computer system includes multiple processing systems that communicate cooperatively over a computer network.

The following discussion explains how the logic, that implements the foregoing operations, transforms the hardware processor of computer system 1900 into a specially programmed electronic circuit.

A hardware processor is a complex electronic circuit designed to respond to certain electronic inputs in a predefined manner. The inputs to a hardware processor are stored as electrical charges. The hardware processor interprets the electrical charge of a given memory circuit as having one of two binary values, namely, zero or one.

A given hardware processor has electrical circuitry designed to perform certain predefined operations in response to certain ordered sets of binary values. The electrical circuitry is built of electronic circuits arranged or configured to respond to one set of ordered binary values one way and to another set of ordinary values another way, all in accordance with the hardware design of the given hardware processor. A given set of ordered binary values to which the hardware processor is designed to respond, in a predefined manner, is an instruction.

The collection of valid instructions to which a given hardware processor is designed to respond, in a predetermined manner, is the native instruction set of the processor, also referred to as a native instruction set of codes. The native instruction set for one hardware processor may be different from the native instruction set for another hardware processor, depending on their manufacture. To control a given hardware processor, it is necessary to select an instruction or a sequence of instructions from the predefined native instruction set of that hardware processor.

A sequence of codes that a hardware processor is to execute, in the implementation of a given task, is referred to herein as logic. Logic is made up, therefore, not of software but of a sequence of codes or instructions, selected from the predefined native instruction set of codes of the hardware processor, and stored in the memory.

Returning to FIG. 19, the memory 1915 is accessible to the processing system 1910 via the bus 1970. The processing system controls also the input or output unit 1920 via the bus 1970. The input or output unit 1920 includes a user interface controller 1950, a display unit controller 1955, a communications unit controller 1960, and storage controller 1965.

The memory 1915 includes the predefined native instruction set of codes 1935, which constitute a set of instructions 1940 selectable for execution by the hardware processor 1925. In an embodiment, the set of instructions 1940 include logic 1945 representing the APS 300 as illustrated in FIG. 2, including the MIC generator 325, the verification system 330, and the verification API 335. In another embodiment, the set of instructions 1940 include logic 1945 representing the RPS 101 as illustrated in FIG. 3, including the UMD engagement logic 130 (a first respective sequence of instructions), the UMD information request logic 135 (a second respective sequence of instructions), the UMD verification logic 140 (a third respective sequence of instructions), and the APS verification logic 145 (a fourth respective sequence of instructions). The terms first through fourth in this paragraph do not imply any order of operation or use but are used only for discrimination of one sequence of instructions from another. In yet another embodiment, the set of instructions 1940 include logic 1945 representing the UMD 200 as illustrated in FIG. 4, including the RPS engagement logic 235, the RPS information access logic 240, the APS provisioning logic 245, and the APS or RPS consent logic 250. This logic 1945 also is set forth above in greater detail with respect to the flowcharts illustrated in FIGS. 6-16.

The logic 1945 is stored in the memory 1915 and comprises instructions 1940 selected from the predefined native instruction set of codes 1935 of the hardware processor 1925, adapted to operate with the processing system 1910 to implement the process or processes of the logic 1945.

CONCLUSION

The various networks are illustrated throughout the drawings and described in other locations throughout this disclosure, can comprise any suitable type of network such as the Internet or a wide variety of other types of networks and combinations thereof. For example, the network may include a wide area network (WAN), a local area network (LAN), a wireless network, an intranet, the Internet, a combination thereof, and so on. Further, although a single network is shown, a network can be configured to include multiple networks.

Computer storage media or memory includes volatile and non-volatile, removable and non-removable media and memory implemented in any method or technology for storage of information such as computer readable instructions, data structures, program modules, or other data. Computer storage media include, but are not limited to, random access memory (RAM), read-only memory (ROM), electrically erasable programmable read-only memory (EE-PROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the desired information and which can be accessed by a mobile device, computer, server, and so forth. For example, instructions embodying an application or program are included in one or more computer-readable storage media, such as tangible media, that store the instructions in a non-transitory manner.

Various techniques are described herein in the general context of software or program modules. Generally, software includes routines, programs, objects, components, data structures, and so forth that perform certain tasks or implement various abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media."

Certain attributes, functions, steps of methods, or sub-steps of methods described herein are associated with physical structures or components, such as a module of a physical device, that in implementations in accordance with this disclosure make use of instructions (e.g., computer executable instructions) that are embodied in hardware, such as an application specific integrated circuit, computer-readable instructions that cause a computer (e.g., a general-purpose computer) executing the instructions to have defined characteristics, a combination of hardware and software such as processor implementing firmware, software, and so forth such as to function as a special purpose computer with the ascribed characteristics.

For example, in embodiments a module comprises a functional hardware unit (such as a self-contained hardware or software or a combination thereof) designed to interface the other components of a system such as through use of an API. In embodiments, a module is structured to perform a function or set of functions, such as in accordance with a described algorithm. This disclosure implements nomenclature that associates a given component or module with a function, purpose, step or sub-step that is used to identify the structure, which in instances includes hardware or software that function for a specific purpose. Invocation of 35 U.S.C. § 112(f) will be accomplished through use of ubiquitous and historically recognized terminology for this purpose. The structure corresponding to the recited function is understood to be the structure corresponding to that function, and the equivalents thereof permitted, to the fullest extent of this written description, which includes the accompanying claims and the drawings as interpreted by one of skill in the art.

Although the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter.

In accordance with some embodiments, information is stored in memory (at least temporarily) during performance of the methods for a variety of reasons. Example rationales include, but are not limited to, data processing convenience, communication convenience, permit batch validation or review, records maintenance, and so on, and combinations thereof.

Although headings are used for the convenience of the reader, these are not to be taken as limiting or restricting the systems, techniques, approaches, methods, devices to those appearing in any section. Rather, the teachings and disclosures herein can be combined or rearranged with other portions of this disclosure and the knowledge of one of ordinary skill in the art. It is the intention of this disclosure to encompass and include such variation.

We claim:

1. A method, for remotely retrieving information from a vehicle, comprising:
    establishing, by a first responder vehicle (FRV), a vehicle connection between the vehicle and the FRV;
    sending, by the FRV, an information request message to the vehicle, via the vehicle connection, seeking a release of information;
    obtaining, by the FRV, authentication of the information received in response to the information request message;
    determining, by the FRV, occupant status based on the information;
    displaying, by the FRV, the occupant status;
    verifying, by an automotive head unit Relying Party System (RPS), a user identity of a user based on a liveness check performed by the RPS;
    collecting mobile identification credential (MIC) user information pertaining to the user; and
    retrieving, by the FRV, the MIC user information over the vehicle connection.

2. The method of claim 1, further comprising the information including vehicle information; and
    determining, by the FRV, a Vehicle Identification Number (VIN) of the vehicle based on the vehicle information.

3. The method of claim 1, wherein the FRV displays the occupant status via an in-vehicle Mobile Data Terminal (MDT).

4. The method of claim 1, further comprising configuring the vehicle according to a mode responsive to verifying the user identity of the user.

5. The method of claim 1, wherein the vehicle connection is based on Wi-Fi.

6. The method of claim 1, wherein the vehicle connection is based on Bluetooth Class 1.

7. The method of claim 1, wherein the vehicle connection is based on Bluetooth Class 2.

8. The method of claim 1, wherein the vehicle connection is based on an indirect connection via a cellular radio system.

9. The method of claim 1, wherein the vehicle connection uses Citizens Band (CB) radio.

10. The method of claim 1, wherein the FRV is configured to send a MIC user information request to the vehicle via the vehicle connection, and the vehicle is configured to pass the MIC user information request to a user mobile-identification-credential device (UMD) of a user via an encrypted local connection.

11. The method of claim 10, wherein the MIC user information request includes an indication of a plurality of release prompts usable by the UMD to generate a privacy dialog displayed to the user.

12. The method of claim 10, wherein the MIC user information request includes an indication of a combination release prompt usable by the UMD to generate a privacy dialog displayed to the user.

13. The method of claim 10, further comprising:
receiving, from the UMD, a user consent response responsive to the MIC user information request; and
forwarding the user consent response to an Authorizing Party System (APS) as a token to obtain MIC user information from the APS.

14. The method of claim 10, further comprising:
receiving, from the UMD, a user consent response responsive to the MIC user information request;
receiving, from the UMD, MIC user information in accordance with the MIC user information request; and
forwarding the user consent response to an Authorizing Party System (APS) as a token to obtain authorization from the APS of the MIC user information received from the UMD.

15. The method of claim 10, further comprising:
receiving, from the UMD, a user consent response responsive to the MIC user information request;
determining that selective user consent contained in the user consent response does not meet the MIC user information request; and
terminating interaction with the UMD due to insufficient user consent.

16. The method of claim 1, further comprising the information including vehicle information pertaining to the vehicle and MIC user information pertaining to at least one occupant of the vehicle.

17. The method of claim 1, further comprising:
sending, by the FRV, a citation to the vehicle via the vehicle connection; and
requesting, by the FRV, vehicle information pertaining to the citation.

18. The method of claim 17, wherein the vehicle information includes operational vehicle status information and mechanical vehicle status information.

19. The method of claim 17, wherein the vehicle information is limited according to a span of time.

20. The method of claim 19, wherein the span of time includes time prior to issuance of the citation sufficient to generate the vehicle information related to actions described in the citation.

* * * * *